US012701110B2

(12) United States Patent
Patil et al.

(10) Patent No.: US 12,701,110 B2
(45) Date of Patent: Aug. 4, 2026

(54) USER INTERFACE AND NETWORK ELEMENTS OF INTEGRATION SYSTEM

(71) Applicant: ConnectWise, LLC, Tampa, FL (US)

(72) Inventors: Prithviraj Patil, Tampa, FL (US); Saurabha Dongaonkar, Tampa, FL (US); Shagun Jain, Tampa, FL (US); Abhijeet Bedagkar, Tampa, FL (US)

(73) Assignee: ConnectWise, LLC, Tampa, FL (US)

( * ) Notice: Subject to any disclaimer, the term of this patent is extended or adjusted under 35 U.S.C. 154(b) by 224 days.

(21) Appl. No.: 18/790,929

(22) Filed: Jul. 31, 2024

(65) Prior Publication Data

US 2025/0370732 A1 Dec. 4, 2025

(30) Foreign Application Priority Data

May 31, 2024 (IN) .............................. 202411042331

(51) Int. Cl.
*H04L 9/40* (2022.01)
*G06F 3/0482* (2013.01)
(Continued)

(52) U.S. Cl.
CPC ............ *H04L 63/08* (2013.01); *G06F 3/0482* (2013.01); *G06F 8/38* (2013.01); *G06F 16/2282* (2019.01);
(Continued)

(58) Field of Classification Search
CPC ....... H04L 63/08; H04L 41/22; H04L 63/083; H04L 63/16; H04L 67/1097; G06F 3/0482; G06F 8/38; G06F 16/2282; G06F 16/25
See application file for complete search history.

(56) References Cited

U.S. PATENT DOCUMENTS 8,452,876 B1 * 5/2013 Williams ................ H04L 41/22
709/227
10,230,571 B2 3/2019 Rangasamy et al.
(Continued)

FOREIGN PATENT DOCUMENTS

CN 111953518 A 11/2020
EP 3764246 A1 1/2021
WO WO-2025/250290 A1 12/2025

OTHER PUBLICATIONS

Invitation to Pay Additional Fees for International Application No. PCT/US25/27001 dated Jul. 25, 2025.
(Continued)

*Primary Examiner* — Asher D Kells
(74) *Attorney, Agent, or Firm* — Foley Hoag LLP; John D. Lanza; Joshua S. Matloff

(57) ABSTRACT

A method for generating self-serve integrations includes receiving a network address of a configuration file that includes parameters to interface with a server. The method extracts, from the configuration file, endpoints and operation(s) available to manipulate each endpoint. The method displays a first table having a rows displaying (a) a given endpoint and (b) a menu for selecting a given operation to manipulate the given endpoint. The method, upon selection of a given row, displays input field(s) that accept a parameter, authorization, header, body, and/or response data. The method gathers, from the server, a data fields available at the given endpoint. The method displays a second table having rows that have data field(s), and input(s) for a data type, a column type, a display name, unit, description, primary key, secondary key, and/or an indexing toggle.

21 Claims, 25 Drawing Sheets

(51) Int. Cl.

| | |
|---|---|
| *G06F 8/38* | (2018.01) |
| *G06F 16/22* | (2019.01) |
| *G06F 16/25* | (2019.01) |
| *H04L 41/22* | (2022.01) |
| *H04L 67/1097* | (2022.01) |

(52) U.S. Cl.
CPC .............. *G06F 16/25* (2019.01); *H04L 41/22* (2013.01); *H04L 63/083* (2013.01); *H04L 63/16* (2013.01); *H04L 67/1097* (2013.01)

(56) References Cited

U.S. PATENT DOCUMENTS

| | | | |
|---|---|---|---|
| 10,268,753 | B2 | 4/2019 | Bar-Or et al. |
| 10,331,422 | B1 | 6/2019 | Russell |
| 10,491,626 | B1 * | 11/2019 | Bhirud .................... H04L 63/14 |
| 10,585,683 | B2 | 3/2020 | Wells et al. |
| 10,630,501 | B2 | 4/2020 | Ansari et al. |
| 10,908,970 | B1 | 2/2021 | Arivazhagan et al. |
| 11,269,871 | B1 | 3/2022 | Bigdelu et al. |
| 11,302,083 | B1 | 4/2022 | Bhushan et al. |
| 11,444,847 | B1 | 9/2022 | Wernick et al. |
| 11,461,378 | B1 * | 10/2022 | Bhushan ............... G06F 16/248 |
| 11,573,971 | B1 | 2/2023 | Cannon et al. |
| 11,579,755 | B1 * | 2/2023 | Coffey ................ G06F 3/04817 |
| 2016/0124742 | A1 | 5/2016 | Rangasamy et al. |
| 2017/0364369 | A1 | 12/2017 | Wells et al. |
| 2019/0147114 | A1 | 5/2019 | MacLean et al. |
| 2019/0250809 | A1 | 8/2019 | Sanches et al. |
| 2020/0036723 | A1 | 1/2020 | Ranchod et al. |
| 2020/0137041 | A1 | 4/2020 | DeGennaro et al. |
| 2020/0210954 | A1 | 7/2020 | Loi |
| 2021/0035116 | A1 | 2/2021 | Berrington et al. |
| 2022/0245125 | A1 | 8/2022 | Weisman et al. |
| 2022/0414323 | A1 | 12/2022 | Sreenivasan et al. |
| 2023/0315749 | A1 | 10/2023 | Haelen |
| 2023/0384904 | A1 | 11/2023 | Gabin et al. |
| 2024/0419817 | A1 | 12/2024 | Bienkowski et al. |

OTHER PUBLICATIONS

Non-Final Office Action for U.S. Appl. No. 18/790,846 dated Mar. 12, 2026.

Notice of Allowance for U.S. Appl. No. 18/790,853 dated Feb. 10, 2026.

Non-Final Office Action for U.S. Appl. No. 18/790,853 dated Apr. 23, 2025.

Armbrust et al., "Delta lake: high-performance ACID table storage over cloud object stores." Proceedings of the VLDB Endowment 13.12: 3411-3424 (2020).

Mozilla, "HTTP request methods", mdn web docs, accessed Feb. 27, 2024 https://developer.mozilla.org/en-US/docs/Web/HTTP/Methods.

Powers, "Writing a KafkaStream to Delta Lakewith Spark Structured Streaming", Delta Lake, https://delta.io/blog/write-kafka-stream-to-delta-lake/ accessed Feb. 24, 2024.

Snowflake Inc,. "Data Integration, Snowflake Documentation," https://docs.snowflake.com/en/user-guide/ecosystem-etl, accessed on Aug. 20, 2024 (May 27, 2024).

International Search Report and Written Opinion for International Application No. PCT/US25/27001 dated Oct. 6, 2025.

Final Office Action for U.S. Appl. No. 18/790,853 dated Nov. 6, 2025.

Office Action for U.S. Appl. No. 18/790,836 dated May 6, 2026.

* cited by examiner

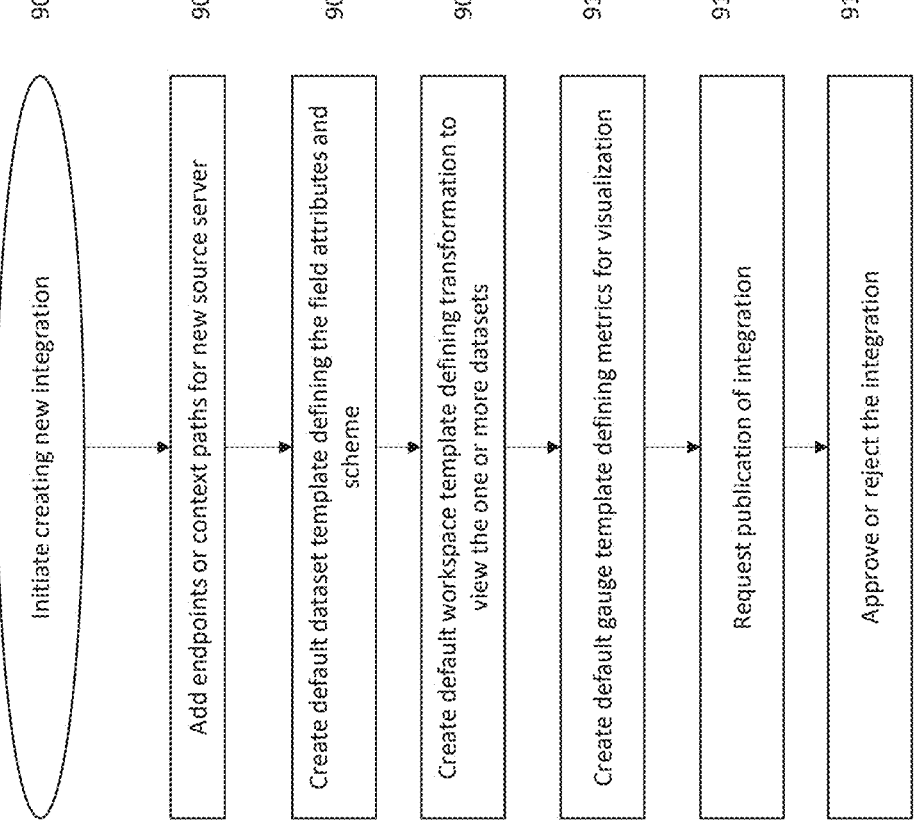

902 — Initiate creating new integration

904 — Add endpoints or context paths for new source server

906 — Create default dataset template defining the field attributes and scheme

908 — Create default workspace template defining transformation to view the one or more datasets 910 — Create default gauge template defining metrics for visualization 912 — Request publication of integration 914 — Approve or reject the integration

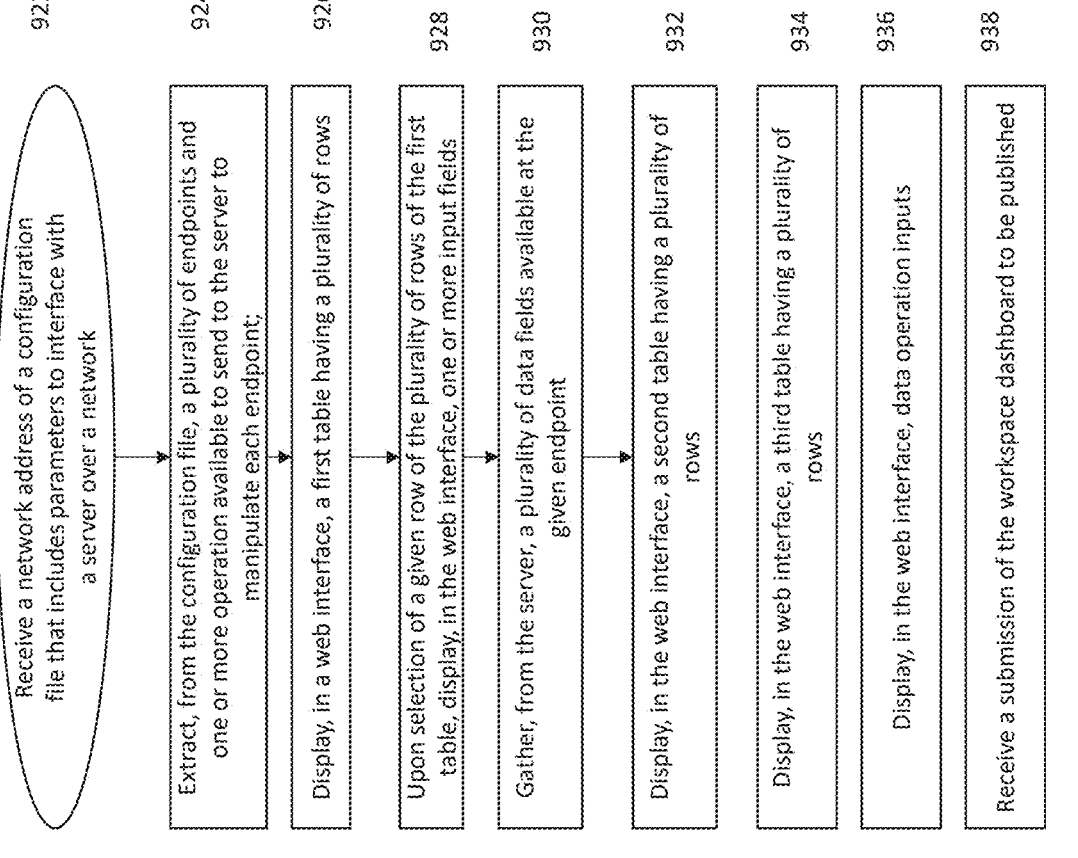

922 Receive a network address of a configuration file that includes parameters to interface with a server over a network 924 Extract, from the configuration file, a plurality of endpoints and one or more operation available to send to the server to manipulate each endpoint;

926 Display, in a web interface, a first table having a plurality of rows

928 Upon selection of a given row of the plurality of rows of the first table, display, in the web interface, one or more input fields 930 Gather, from the server, a plurality of data fields available at the given endpoint 932 Display, in the web interface, a second table having a plurality of rows 934 Display, in the web interface, a third table having a plurality of rows 936 Display, in the web interface, data operation inputs 938 Receive a submission of the workspace dashboard to be published

Receive, from a vendor layer via a web based portal running on an extensibility layer, an integration with a server

944

Send the integration to a data integration layer

946

Send configuration data to the data integration later having stream schema, the integration data , and target information

940

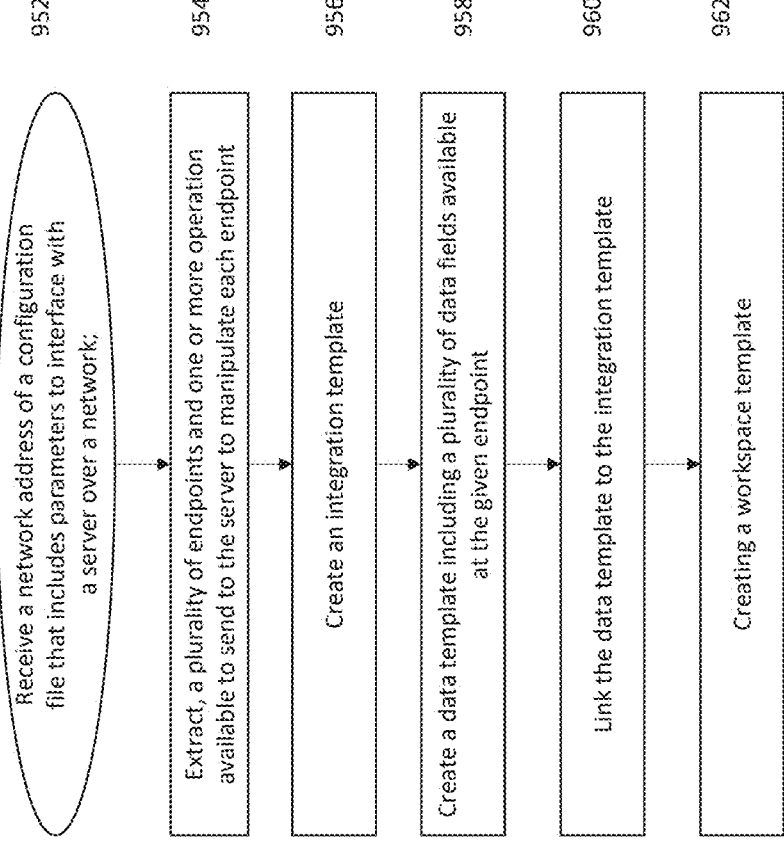

952

Receive a network address of a configuration file that includes parameters to interface with a server over a network;

954

Extract, a plurality of endpoints and one or more operation available to send to the server to manipulate each endpoint

956

Create an integration template

958

Create a data template including a plurality of data fields available at the given endpoint

960

Link the data template to the integration template

962

Creating a workspace template

Figure 9E:
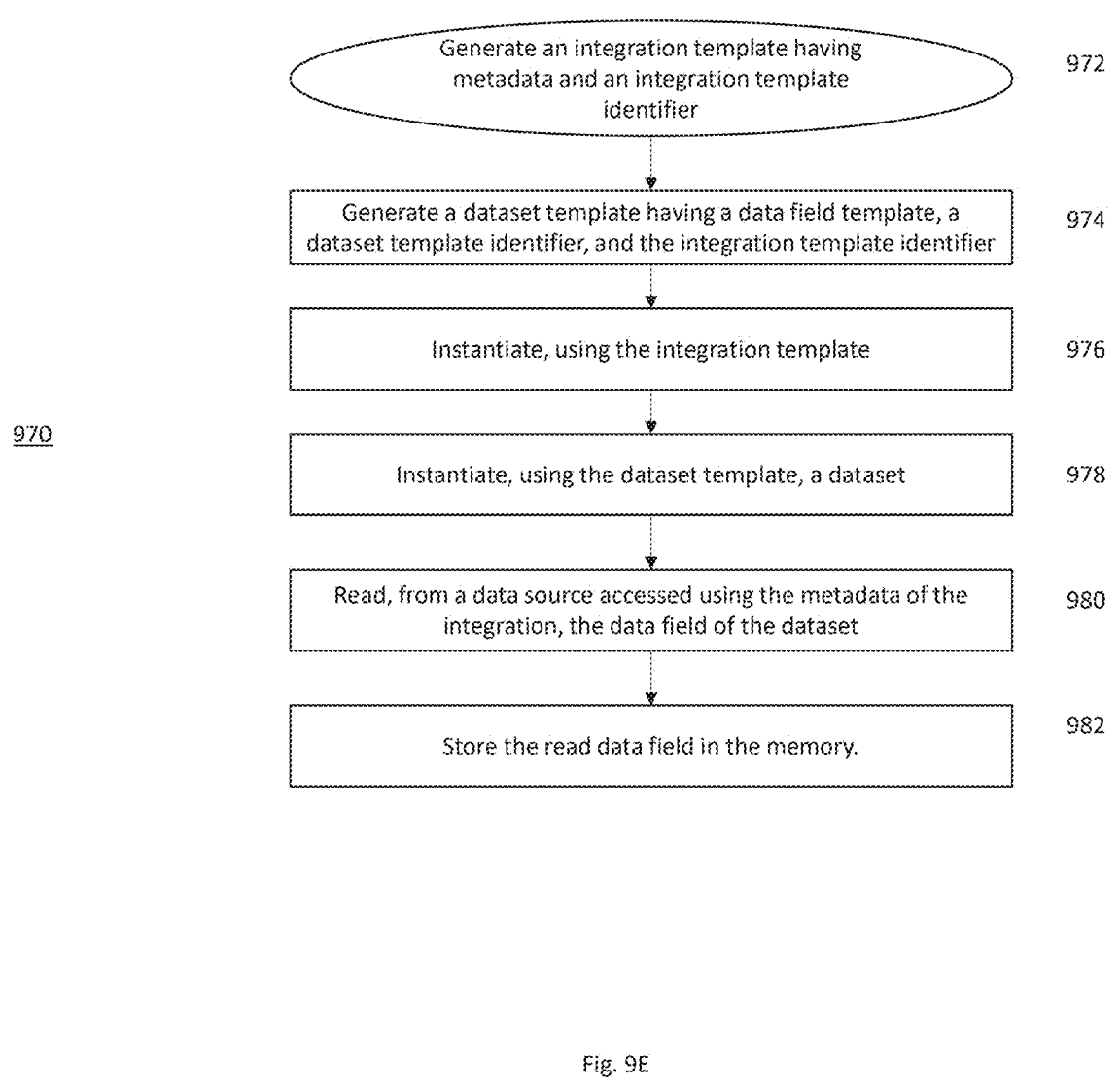

Generate an integration template having metadata and an integration template identifier

974

Generate a dataset template having a data field template, a dataset template identifier, and the integration template identifier

976

Instantiate, using the integration template

978

Instantiate, using the dataset template, a dataset

980

Read, from a data source accessed using the metadata of the integration, the data field of the dataset

982

Store the read data field in the memory.

Figure 12C:
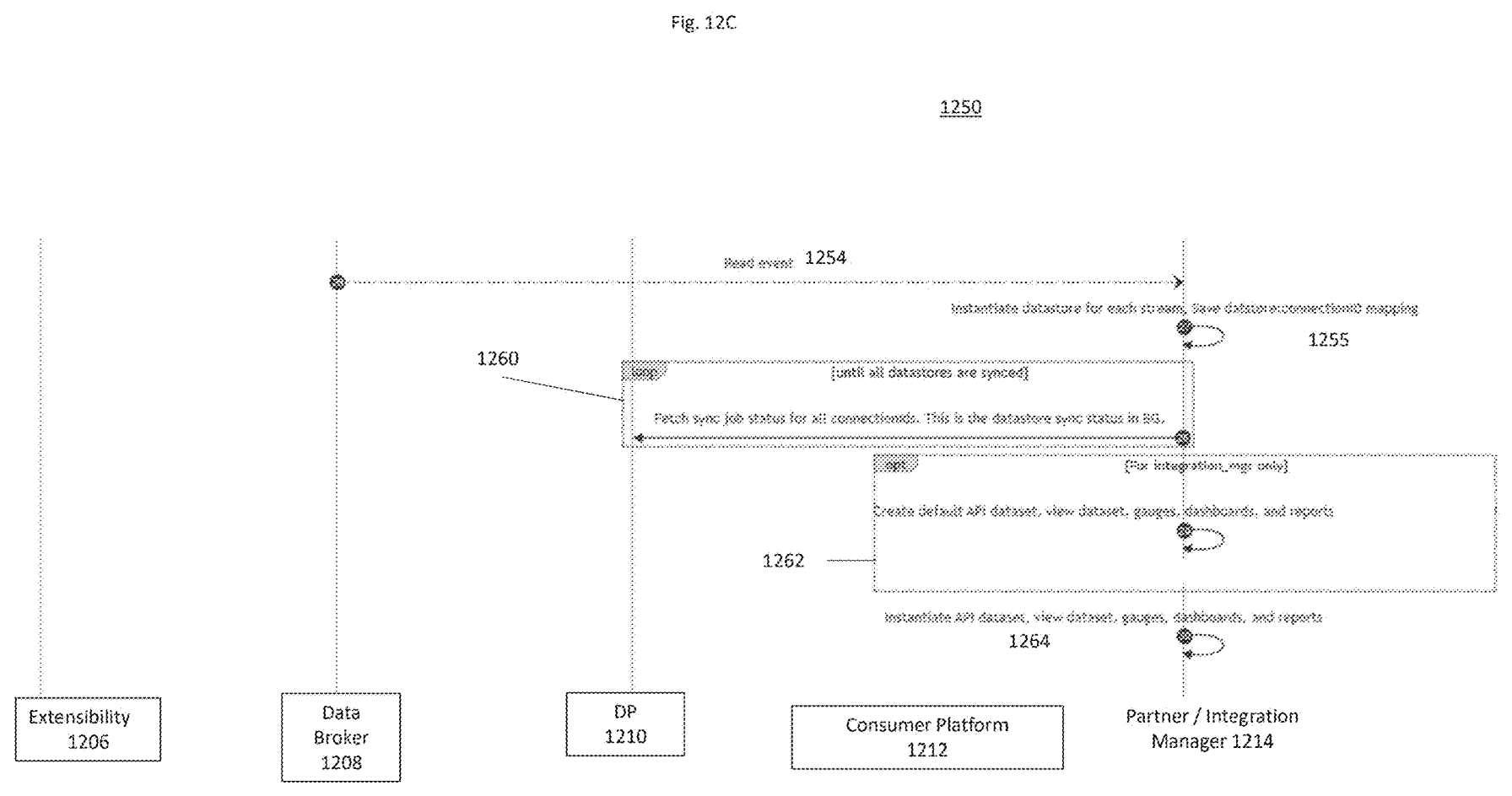

Instantiate datastore for each sample. Save datastore-connect-token mapping

1255

[For integration apps only]

Create default API dataset, view dataset, gauges, dashboards, and reports

1264

Instantiate app dataset, view dataset, gauges, dashboards, and reports

1262

Partner / Integration
Manager 1214

Consumer Platform
1212

Read event 1254

[until all datastores are synced]

Fetch sync job status for all connections. This is the datastore sync status in RL

1260

DP
1210

Data
Broker
1208

Extensibility
1206

USER INTERFACE AND NETWORK ELEMENTS OF INTEGRATION SYSTEM

CROSS-REFERENCE TO APPLICATIONS

This application claims priority to Indian Provisional Patent Application No. 202411042331 dated May 31, 2024.

BACKGROUND

Embodiments of the present disclosure relate to managed service providers (MSP) and technology service providers (TSP). MPS and TSP are entities that manage information technology and related infrastructure of an entity.

BRIEF SUMMARY

In some embodiments, a computer-implemented method comprises receiving a network address of a configuration file that comprises parameters to interface with a server over a network. The method can include extracting, from the configuration file, a plurality of endpoints and a plurality of operations available to send to the server to manipulate each endpoint. The method can include displaying, in a web interface, a first table having a plurality of rows. Each row can display (a) an endpoint of the plurality of endpoints and (b) a menu for selecting a one of the operations of the plurality of operations available to send to the server to manipulate the endpoint. The method can include, upon selection of a given row of the plurality of rows of the first table, displaying, in the web interface, an input field. The input field, for the one of the operations to send to the server to manipulate the endpoint, can accept one or more of a parameter, authorization, header, body, and response data. The method can comprise gathering, from the server, a plurality of data fields available at the endpoint. The method can comprise displaying, in the web interface, a second table having a plurality of rows. Each row having one of the plurality of data fields, and inputs for one or more of a data type, a column type, a display name, unit, description, primary key, secondary key, and an indexing toggle. The method can comprise displaying, in the web interface, a third table having a plurality of rows, each row having one of the plurality of data fields and a toggle for including the data field in a workspace dashboard. The method can comprise displaying, in the web interface, data operation inputs including at least one of a table joining input, a data formula input, and a data filter input. The method can comprise sending a submission of the workspace dashboard to be published. The workspace dashboard can be defined by (a) the one of the operations to send to the server to manipulate the endpoint, and the one or more of a parameter, authorization, header, body, and response data, (b) the plurality of data fields selected by the third table, and one or more of a data type, column type, a display name, unit, description, primary key, secondary key, and an indexing toggle, and (c) the data operation inputs.

In some embodiments, the computer-implemented method can comprise displaying, in the web interface, the workspace dashboard including a real-time representation of values of results of the data operation inputs on the plurality of data fields. The real-time representation can be streamed to the web interface as the one of the operations are sent to the server.

In some embodiments, the computer-implemented method can comprise sending the workplace dashboard to a second server for verification. The method can comprise upon verification at the second server, publishing the workplace dashboard in a public or semi-public directory.

In some embodiments, the interface with the server over the network is one or more of REST API, GraphQL, Kafka, OData, Websocket, OpenAPI, and FileSystem.

The computer-implemented method of claim 1, wherein each row of the first table further comprises inputs for one or more of refresh rate, and timeout length.

In some embodiments, the configuration file is formatted as one or more of a YAML file and a Swagger file.

In some embodiments, the computer-implemented method can comprise extracting, from the configuration file, server information. The server information can be one or more of a product logo file, product type, product name, and a connector type. The method can also comprise displaying the server information in the web interface in a same screen as the first table.

In some embodiments, a system comprises a computing node comprising a computer readable storage medium having program instructions embodied therewith. The program instructions executable by a processor of the computing node to cause the processor to perform a method comprising receiving a network address of a configuration file that comprises parameters to interface with a server over a network. The method can further comprise extracting, from the configuration file, a plurality of endpoints and a plurality of operations available to send to the server to manipulate each endpoint. The method can further comprise displaying, in a web interface, a first table having a plurality of rows, each row displaying (a) an endpoint of the plurality of endpoints and (b) a menu for selecting one of the operations available of the plurality of operations available to send to the server to manipulate the endpoint. The method can further comprise, upon selection of a given row of the plurality of rows of the first table, displaying, in the web interface, an input field. The input field, for the one of the operations available to send to the server to manipulate the endpoint, can accept one or more of parameter, authorization, header, body, and response data. The method can comprise gathering, from the server, a plurality of data fields available at the endpoint. The method can comprise displaying, in the web interface, a second table having a plurality of rows. Each row can have one of the plurality of data fields, and inputs for one or more of data type, column type, a display name, unit, description, primary key, secondary key, and an indexing toggle. The method can comprise displaying, in the web interface, a third table having a plurality of rows. Each row has one of the plurality of data fields and a toggle for including the data field in a workspace dashboard. The method can comprise displaying, in the web interface, data operation inputs including at least one of a table joining input, a data formula input, and a data filter input. The method can comprise sending a submission of the workspace dashboard to be published. The workspace dashboard can be defined by: (a) the one of the operations available to send to the server to manipulate the endpoint, and the one or more of parameter, authorization, header, body, and response data, (b) the plurality of data fields selected by the third table, and one or more of data type, column type, a display name, unit, description, primary key, secondary key, and an indexing toggle, and (c) the data operation inputs.

In some embodiments, the method executed by the processor of the system further comprises displaying, in the web interface, the workspace dashboard including a real-time representation of values of results of the data operation inputs on the plurality of data fields. The real-time representation can be streamed to the web interface as the one of the operations available is sent to the server.

In some embodiments, the method executed by the processor of the system further comprises sending the workplace dashboard to a second server for verification. The method further comprises, upon verification at the second server, publishing the workplace dashboard in a public or semi-public directory.

In some embodiments, the interface with the server over the network is one or more of REST API, GraphQL, Kafka, OData, Websocket, OpenAPI, and FileSystem.

In some embodiments, each row of the first table further comprises inputs for one or more of refresh rate, and timeout length.

In some embodiments, the configuration file is formatted as one or more of a YAML file and a Swagger file.

In some embodiments, the method executed by the processor of the system further comprises extracting, from the configuration file, server information. The server information can be one or more of a product logo file, product type, product name, and a connector type. The method can further comprise displaying the server information in the web interface in a same screen as the first table.

In some embodiments, a computer program product for generating an integration can comprising a computer readable storage medium having program instructions embodied therewith. The program instructions can be executable by a computer to cause the computer to perform a method comprising receiving a network address of a configuration file that comprises parameters to interface with a server over a network. The method can comprise extracting, from the configuration file, a plurality of endpoints and a plurality of operation available to send to the server to manipulate each endpoint. The method can comprise displaying, in a web interface, a first table having a plurality of rows. Each row can display (a) an endpoint of the plurality of endpoints and (b) a menu for selecting one of the plurality of operations available to send to the server to manipulate the endpoint. The method can, upon selection of a given row of the plurality of rows of the first table, display, in the web interface, one or more input fields. The input fields, for the one of the operations available to send to the server to manipulate the endpoint, accept one or more of parameter, authorization, header, body, and response data. The method can further gather, from the server, a plurality of data fields available at the endpoint. The method can further display, in the web interface, a second table having a plurality of rows. Each row can have one of the plurality of data fields, and inputs for one or more of data type, column type, a display name, unit, description, primary key, secondary key, and an indexing toggle. The method can further display, in the web interface, a third table having a plurality of rows. Each row can have one of the plurality of data fields and a toggle for including the data field in a workspace dashboard. The method can further display, in the web interface, data operation inputs including at least one of a table joining input, a data formula input, and a data filter input. The method can further send a submission of the workspace dashboard to be published, the workspace dashboard defined by (a) the one of the operations available to send to the server to manipulate the endpoint, and the one or more of parameter, authorization, header, body, and response data, (b) the plurality of data fields selected by the third table, and one or more of data type, column type, a display name, unit, description, primary key, secondary key, and an indexing toggle, and (c) the data operation inputs.

In some embodiments, the method stored by the program instructions further comprise displaying, in the web interface, the workspace dashboard including a real-time representation of values of results of the data operation inputs on the plurality of data fields, the real-time representation being streamed to the web interface as the one of the operations available is sent to the server.

In some embodiments, the method of the program instructions further comprise sending the workplace dashboard to a second server for verification. The method can comprise, upon verification at the second server, publishing the workplace dashboard in a public or semi-public directory.

In some embodiments, the interface with the server over the network is one or more of REST API, GraphQL, Kafka, OData, Websocket, OpenAPI, and FileSystem.

In some embodiments, each row of the first table further comprises inputs for one or more of refresh rate, and timeout length.

In some embodiments, the configuration file is formatted as one or more of a YAML file and a Swagger file.

In some embodiments, the method of the program instructions further comprises extracting, from the configuration file, server information, the server information being one or more of a product logo file, product type, product name, and a connector type. The method further comprises displaying the server information in the web interface in a same screen as the first table.

In some embodiments, a computer-implemented method comprise receiving a network address of a configuration file that comprises parameters to interface with a server over a network. The method can comprise extracting, a plurality of endpoints and a plurality of operations available to send to the server to manipulate each endpoint. The method can creating an integration template including (a) one of the endpoints of the plurality of endpoints, (b) one of the operations available of the plurality of operations to send to the server to manipulate the one of the endpoints, and (c) an input fields for the one of the operations available to send to the server to manipulate the one of the endpoints. The one or more input fields can comprise a parameter, authorization, header, body, and response data. The method can comprise creating a data template including a data field available at the one of the endpoints. The method can comprise linking the data template to the integration template. The method can comprise creating a workspace template. The workspace template can have at least one manipulation of the plurality of data fields of the data template. The at least one manipulation being one of a table joining operation, a data formula operation, and a data filter operation.

In some embodiments, the computer-implemented method further comprises instantiating an integration based on the integration template. The integration can comprise an identifier of the integration template. The method can comprise, in response to instantiating the integration, instantiating a dataset based on the dataset template, the dataset including an identifier of the dataset template. The method can comprise, in response to instantiating the dataset, instantiating a workspace based on the workspace template, the workspace including an identifier of the workspace template.

In some embodiments, the integration is a first integration, and the first integration is instantiated for a first authentication data. The method can further comprise instantiating a second integration based on the integration template. The second integration can be instantiated for a second authentication data. The second integration can comprise the identifier of the integration template. The method can instantiating a second dataset based on the dataset template, The second dataset can including the identifier of the dataset template. The first dataset and second dataset can be stored in a same memory.

In some embodiments, instantiating the dataset further comprises downloading raw data from the server in a format native to the server, translating the raw data to translated data in a format native to the integration, and displaying the translated data in the workspace.

In some embodiments, displaying the translated data in the workspace further comprises displaying the translated data in a gauge associated with the workspace.

In some embodiments, the method further comprise creating a gauge template, the gauge template having a visualization of data module. The method can further comprise linking the gauge template to the workspace template.

In some embodiments, the method can further comprise modifying a configuration of the integration template. The method can further comprise, responsive to modifying the integration template, applying the configuration to the data template.

In some embodiments, the method further comprises modifying a configuration of the integration template. The method can further comprise, responsive to modifying the integration template, applying the configuration to the workspace template.

In some embodiments, the method further comprises modifying a configuration of the integration template. The method can further comprise responsive to modifying the integration template, applying the configuration to the instantiated integration.

In some embodiments, a system comprises a computing node comprising a computer readable storage medium having program instructions embodied therewith. The program instructions executable by a processor of the computing node to cause the processor to perform a method comprising receiving a network address of a configuration file that comprises parameters to interface with a server over a network. The method further comprises extracting, a plurality of endpoints and a plurality of operations available to send to the server to manipulate each endpoint. The method further comprises creating an integration template including (a) one of the endpoints of the plurality of endpoints, (b) one of the operations of the plurality of operations available to send to the server to manipulate the one of the endpoints, and (c) an input fields for the one of the operations to send to the server to manipulate the one of the endpoints. The one or more input fields can comprise a parameter, authorization, header, body, and response data. The metho can further comprise creating a data template including a data field available at the one of the endpoints. The method can further comprise linking the data template to the integration template. The method can further comprise creating a workspace template, the workspace template having at least one manipulation of the plurality of data fields of the data template, the at least one manipulation being one of a table joining operation, a data formula operation, and a data filter operation.

In some embodiments, the method stored by the program instructions further comprises instantiating an integration based on the integration template. The integration can comprise an identifier of the integration template. The method can further comprise, in response to instantiating the integration, instantiating a dataset based on the dataset template, the dataset including an identifier of the dataset template. The method can further comprise, in response to instantiating the dataset, instantiating a workspace based on the workspace template, the workspace including an identifier of the workspace template.

In some embodiments, the integration is a first integration, and the first integration is instantiated for a first authentication data. The method can further comprise instantiating a second integration based on the integration template. The second integration can be instantiated for a second authentication data. The second integration can comprise the identifier of the integration template. The method can include instantiating a second dataset based on the dataset template. The second dataset can include the identifier of the dataset template. The first dataset and second dataset can be stored in a same memory.

In some embodiments, instantiating the dataset further comprises downloading raw data from the server in a format native to the server, translating the raw data to translated data in a format native to the integration, and displaying the translated data in the workspace.

In some embodiments, displaying the translated data in the workspace further comprises displaying the translated data in a gauge associated with the workspace.

In some embodiments, the method stored by the program instructions further comprises creating a gauge template, the gauge template having a visualization of data module. The method further comprises linking the gauge template to the workspace template.

In some embodiments, the method stored by the program instructions further comprises modifying a configuration of the integration template. The method further comprises responsive to modifying the integration template, applying the configuration to the data template.

In some embodiments, the method stored by the program instruction further comprises modifying a configuration of the integration template. The method further comprises, responsive to modifying the integration template, applying the configuration to the workspace template.

In some embodiments, the method stored by the program instructions further comprises modifying a configuration of the integration template. The method further comprises, responsive to modifying the integration template, applying the configuration to the instantiated integration.

In some embodiments, a computer program product for generating an integration comprises a computer readable storage medium having program instructions embodied therewith. The program instructions can be executable by a processor to cause the processor to perform a method comprising receiving a network address of a configuration file that includes parameters to interface with a server over a network. The method can further comprise extracting, a plurality of endpoints and a plurality of operations available to send to the server to manipulate each endpoint. The method can further comprise creating an integration template including (a) one of the endpoints of the plurality of endpoints, (b) one of the plurality of operations available of the plurality of operations to send to the server to manipulate the one of the endpoints, and (c) an input fields for the one of the operations to send to the server to manipulate the one of the endpoints. The one or more input fields can include a parameter, authorization, header, body, and response data. The method can further comprise creating a data template comprising a data field available at the one of the endpoints. The method can further comprise linking the data template to the integration template. The method can further comprise creating a workspace template. The workspace template can have at least one manipulation of the plurality of data fields of the data template. The at least one manipulation comprises one of a table joining operation, a data formula operation, and a data filter operation.

In some embodiments, the method stored by the program instructions cause the processor to further perform instantiating an integration based on the integration template, the integration including an identifier of the integration template. The method can further comprise, in response to instantiating the integration, instantiating a dataset based on the dataset template, the dataset including an identifier of the dataset template. The method can further comprise, in response to instantiating the dataset, instantiating a workspace based on the workspace template, the workspace including an identifier of the workspace template.

In some embodiments, a computer-implemented method comprises generating an integration template having metadata and a integration template identifier. The method can further comprise generating a dataset template having a data field template, a dataset template identifier, and the integration template identifier. The method can further comprise instantiating, using the integration template, an integration having the integration template identifier and the metadata. The method can further comprise instantiating, using the dataset template, a dataset having the dataset template identifier, a dataset identifier, and a data field corresponding to the data field template. The dataset can be stored in a memory and indexed by the dataset identifier. The method can further comprise reading, from a data source accessed using the metadata of the integration, the data field of the dataset. The method can further comprise storing the read data field in the memory.

In some embodiments, the method can further comprise generating a workspace template having a workspace template idea and the data field. The method can further comprise instantiating, using the workspace template, a workspace having the workspace template identifier, a workspace identifier, and the data field of the dataset.

In some embodiments, the method can further comprise receiving a second metadata, replacing the metadata of the integration template with the second metadata, replacing the metadata of the integration with the second metadata, and reading, from the data source accessed using the second metadata of the integration. In some embodiments, the method can further comprise replacing the metadata of the workspace template with the second metadata and replacing the metadata of the workspace with the second metadata. In some embodiments, the method can further comprise generating a gauge template. The gauge template can a gauge identifier and the workspace template identifier. The method can further comprise instantiating, using the gauge template, the gauge having the gauge template identifier and a gauge identifier, replacing the metadata of the gauge template with the second metadata, and replacing the metadata of the gauge with the second metadata.

In some embodiments, the method can further comprise generating a gauge template, the gauge template having a gauge identifier and the workspace template identifier. The method can further include instantiating, using the gauge template, the gauge having the gauge template identifier and a gauge identifier. The method can further include displaying, with the gauge, a representation of the data field of the dataset.

In some embodiments, the data field is in a format native to the data source. The method can further comprise transforming the data field to a standardized format.

In some embodiments, a system includes a computing node comprising a computer readable storage medium having program instructions embodied therewith. The program instructions executable by a processor of the computing node can cause the processor to perform a method comprising generating an integration template having metadata and a integration template identifier. The method can further comprise generating a dataset template having a data field template, a dataset template identifier, and the integration template identifier. The method can further comprise instantiating, using the integration template, an integration having the integration template identifier and the metadata. The method can further comprise instantiating, using the dataset template, a dataset having the dataset template identifier, a dataset identifier, and a data field corresponding to the data field template. The dataset can be stored in a memory and indexed by the dataset identifier. The method can further comprise reading, from a data source accessed using the metadata of the integration, the data field of the dataset. The method can further comprise storing the read data field in the memory.

In some embodiments, the method stored by the program instructions further comprises generating a workspace template having a workspace template idea and the data field. The method can further comprise instantiating, using the workspace template, a workspace having the workspace template identifier, a workspace identifier, and the data field of the dataset.

In some embodiments, the method stored by the program instructions further comprises receiving a second metadata. The method can further comprise replacing the metadata of the integration template with the second metadata. The method can further comprise replacing the metadata of the integration with the second metadata. The method can further comprise reading, from the data source accessed using the second metadata of the integration. The method can further comprise replacing the metadata of the workspace template with the second metadata. The method can further comprise replacing the metadata of the workspace with the second metadata.

In some embodiments, the method stored by the program instructions further comprises generating a gauge template. The gauge template can have a gauge identifier and the workspace template identifier. The method can further comprise instantiating, using the gauge template, the gauge having the gauge template identifier and a gauge identifier. The method can further comprise replacing the metadata of the gauge template with the second metadata. The method can further comprise replacing the metadata of the gauge with the second metadata.

In some embodiments, the method stored by the program instructions further comprises generating a gauge template. The gauge template can have a gauge identifier and the workspace template identifier. The method can further comprise instantiating, using the gauge template, the gauge having the gauge template identifier and a gauge identifier. The method can further comprise displaying, with the gauge, a representation of the data field of the dataset.

In some embodiments, the data field is in a format native to the data source. The method stored by the program instructions further comprises transforming the data field to a standardized format.

In some embodiments, a computer program product for generating an integration comprises a computer readable storage medium having program instructions embodied therewith. The program instructions can be executable by a processor to cause the processor to perform a method comprising generating an integration template having metadata and a integration template identifier. The method can further comprise generating a dataset template having a data field template, a dataset template identifier, and the integration template identifier. The method can further comprise instantiating, using the integration template, an integration having the integration template identifier and the metadata. The method can further comprise instantiating, using the dataset template, a dataset having the dataset template identifier, a dataset identifier, and a data field corresponding to the data field template. The dataset can be stored in a memory and indexed by the dataset identifier. The method can further comprise reading, from a data source accessed using the metadata of the integration, the data field of the dataset. The method can further comprise storing the read data field in the memory.

In some embodiments, the method stored by the program instructions further comprises generating a workspace template having a workspace template idea and the data field. The method can further comprise instantiating, using the workspace template, a workspace having the workspace template identifier, a workspace identifier, and the data field of the dataset.

In some embodiments, the method stored by the program instructions further comprise receiving a second metadata, replacing the metadata of the integration template with the second metadata, replacing the metadata of the integration with the second metadata, and reading, from the data source accessed using the second metadata of the integration.

In some embodiments, the method stored by the program instructions further comprise replacing the metadata of the workspace template with the second metadata and replacing the metadata of the workspace with the second metadata.

In some embodiments, the method stored by the program instructions generating a gauge template. The gauge template can have a gauge identifier and the workspace template identifier. The method can further comprise instantiating, using the gauge template, the gauge having the gauge template identifier and a gauge identifier. The method can further comprise The method can further comprise replacing the metadata of the gauge template with the second metadata. The method can further comprise replacing the metadata of the gauge with the second metadata.

In some embodiments, the method stored by the program instructions further comprises generating a gauge template, the gauge template having a gauge identifier and the workspace template identifier. The method can further comprise instantiating, using the gauge template, the gauge having the gauge template identifier and a gauge identifier. The method can further comprise displaying, with the gauge, a representation of the data field of the dataset.

In some embodiments, the data field is in a format native to the data source. In some embodiments, the method stored by the program instructions further comprises transforming the data field to a standardized format.

In some embodiments, a computer-implemented method comprises receiving, from a vendor layer via a web based portal running on an extensibility layer, an integration with a server. The integration can comprise an endpoint schema of the server, a plurality of data fields, one of data refresh intervals and an authentication mechanism. The method can further comprise sending the integration to a data integration layer. The method can further comprise receiving, in response to sending the integration to the data integration layer, configuration data having the integration data, and an address of a data store.

In some embodiments, the method can further comprise sending, to an integration review interface running on the extensibility layer, the integration data of the integration. The method can further comprise receiving approval, at the extensibility layer, of the integration. The method can further comprise in response to the approval, authorizing the integration to be sent to the data broker layer for configuration.

In some embodiments, the method further comprises sending, to a partner server, a plurality of integrations from the extensibility layer, the plurality of integrations including the integration. The method can further comprise receiving, from the partner server, an integration of the plurality of integrations selected in a web interface of the partner server and authentication information for the integration. The method can further comprise The method can further comprise saving the authentication information for the integration at the extensibility layer. The method can further comprise sending, to the data streaming service, an event indicating the integration is enabled. The method can further comprise creating a stream for each data field of the given integration. The method can further comprise sending, to the partner server, data retrieved from the stream for each data field at the web interface of the partner server.

In some embodiments, the method can further comprise storing data received from the stream in a data store. In some embodiments, the method can further comprise receiving, from the vendor layer via the web based portal, a first workspace configured to access the plurality of data fields of the integration. The method can further comprise receiving, from the vendor layer via the web based portal, a second workspace configured to access the plurality of data fields of the integration. The first workplace and the second workspace can be configured to access the plurality of data fields via the data store. In some embodiments, the method further comprises receiving, from the vendor layer via the web based portal, a first gauge configured to access the plurality of data fields of the integration. The method can further comprise receiving, from the vendor layer via the web based portal, a second gauge configured to access the plurality of data fields of the integration. The first gauge and the second gauge can be configured to access the plurality of data fields via the data store.

In some embodiments, the method can further comprise extracting raw data from the server at the data integration layer using the endpoint schema of the integration. The method can further comprise transforming the data at a data transformation layer.

In some embodiments, a system comprises a computing node comprising a computer readable storage medium having program instructions embodied therewith. The program instructions can be executable by a processor of the computing node to cause the processor to perform a method comprising receiving, from a vendor layer via a web based portal running on an extensibility layer, an integration with a server. The integration can comprise an endpoint schema of the server, a plurality of data fields, one of data refresh intervals and an authentication mechanism. The method can further comprise sending the integration to a data integration layer. The method can further comprise receiving, in response to sending the integration to the data integration layer, configuration data having the integration data, and an address of a data store.

In some embodiments, the method stored by the program instructions further comprises sending, to an integration review interface running on the extensibility layer, the integration data of the integration. The method can further comprise receiving approval, at the extensibility layer, of the integration. The method can further comprise in response to the approval, authorizing the integration to be sent to the data broker layer for configuration.

In some embodiments, the method stored by the program instructions further comprises sending, to a partner server, a plurality of integrations from the extensibility layer, the plurality of integrations including the integration. The method can further comprise receiving, from the partner server, an integration of the plurality of integrations selected in a web interface of the partner server and authentication information for the integration. The method can further comprise saving the authentication information for the integration at the extensibility layer. The method can further comprise sending, to the data streaming service, an event indicating the integration is enabled. The method can further comprise creating a stream for each data field of the given integration. The method can further comprise sending, to the partner server, data retrieved from the stream for each data field at the web interface of the partner server.

In some embodiments, the method stored by the program instructions further comprise storing data received from the stream in a data store.

In some embodiments, the method stored by the program instructions further comprise receiving, from the vendor layer via the web based portal, a first workspace configured to access the plurality of data fields of the integration. The method can further comprise receiving, from the vendor layer via the web based portal, a second workspace configured to access the plurality of data fields of the integration. The first workplace and the second workspace can be configured to access the plurality of data fields via the data store.

In some embodiments, the method stored by the program instructions further comprise receiving, from the vendor layer via the web based portal, a first gauge configured to access the plurality of data fields of the integration. The method can further comprise receiving, from the vendor layer via the web based portal, a second gauge configured to access the plurality of data fields of the integration. The method can further comprise wherein the first gauge and the second gauge are configured to access the plurality of data fields via the data store.

In some embodiments, the method stored by the program instructions further comprise extracting raw data from the server at the data integration layer using the endpoint schema of the integration. The method can further comprise transforming the data at a data transformation layer.

In some embodiments, a computer program product for generating an integration comprises a computer readable storage medium having program instructions embodied therewith. The program instructions can be executable by a processor to cause the processor to perform a method comprising receiving, from a vendor layer via a web based portal running on an extensibility layer, an integration with a server. The integration can include an endpoint schema of the server, a plurality of data fields, one of data refresh intervals and an authentication mechanism. The method can further comprise sending the integration to a data integration layer. The method can further comprise receiving, in response to sending the integration to the data integration layer, configuration data having the integration data, and an address of a data store.

In some embodiments, the method stored by the program instructions further comprise sending, to an integration review interface running on the extensibility layer, the integration data of the integration. The method can further comprise receiving approval, at the extensibility layer, of the integration. The method can further comprise, in response to the approval, authorizing the integration to be sent to the data broker layer for configuration.

In some embodiments, the method stored by the program instructions further comprise sending, to a partner server, a plurality of integrations from the extensibility layer, the plurality of integrations including the integration. The method can further comprise receiving, from the partner server, an integration of the plurality of integrations selected in a web interface of the partner server and authentication information for the integration. The method can further comprise saving the authentication information for the integration at the extensibility layer. The method can further comprise sending, to the data streaming service, an event indicating the integration is enabled. The method can further comprise creating a stream for each data field of the given integration. The method can further comprise sending, to the partner server, data retrieved from the stream for each data field at the web interface of the partner server.

In some embodiments, the method stored by the program instructions further comprise storing data received from the stream in a data store. In some embodiments, the method further comprises receiving, from the vendor layer via the web based portal, a first workspace configured to access the plurality of data fields of the integration. The method can further comprise receiving, from the vendor layer via the web based portal, a second workspace configured to access the plurality of data fields of the integration. The first workplace and the second workspace can be configured to access the plurality of data fields via the data store.

In some embodiments, the method stored by the program instructions further comprise receiving, from the vendor layer via the web based portal, a first gauge configured to access the plurality of data fields of the integration. The method can further comprise receiving, from the vendor layer via the web based portal, a second gauge configured to access the plurality of data fields of the integration. The first gauge and the second gauge can be configured to access the plurality of data fields via the data store.

In some embodiments, the method stored by the program instructions further comprise extracting raw data from the server at the data integration layer using the endpoint schema of the integration and transforming the data at a data transformation layer.

In some embodiments, a layer can be a server, computer, computing node, or other computing device that executes program instructions stored on a memory. A layer can send and receive messages and data with another layer or a server, computer, computing node, or other computing device over a network, the Internet, or intranet.

BRIEF DESCRIPTION OF THE SEVERAL VIEWS OF THE DRAWINGS

FIGS. 9A-E are flowcharts illustrating methods of creating a new integration according to embodiments of the present disclosure.

FIGS. 12A-C depict network diagrams of creation and use of an integration in accordance with embodiments of the present disclosure.

DETAILED DESCRIPTION

Alternative analytics platforms provide analytics to managed service providers (MSPs) and technology service providers (TSPs) by providing dashboards with business process data, reporting data, goal management data, tracking data, and other data, etc. These analytics platforms feature many integrations with digital software products of the analytics platform's own brand, but also for other digital software products that are used by MSPs. While these alternate systems have the ability to integrate other digital software products, a trained integration engineer is needed to generate and add the integrations to the analytics platforms. When users need an integration to a new digital software product, they have to request the integration to be made and wait for an integration engineer to be assigned to the project and create the integration. This process creates a bottleneck and generates a backlog of integration requests from users of the analytics platforms.

In some embodiments, an analytics platform for auto-provisioning an integration for a partner onboarded on RMM/PSA product is desired. In some embodiments, a new means of access to the product data without the rate limitations of the product's public APIs or without putting too much strain on app services is desired. In some embodiments, access to historical data is desired. In some embodiments, access to data in near-real time is desired.

In some embodiments, the present disclosure provides a no-code ability for a user of an analytics platform to create a new integration request. Embodiments of the system and method of the present disclosure provide the ability for users of the analytics platform (e.g., partners, software vendors) to add new integrations as needed without writing code.

In some embodiments, the no-code environment provides basic building blocks/components in pre-production for a user. The user can add a new integration from a library of connector types, transformations, and schemas that are configured to create a template of integration. Once created, integration template can then be reviewed by an administrator user (e.g., an admin user) for safety and efficacy before publishing the integration for other users.

Analytics products receive data from different sources (e.g., different servers accessed through the Internet) and perform operations on the received data before displaying insights in the form of visualization, reports, notifications, etc.

In some embodiments, an integration is a modular component (e.g., a building block) that provides an interface between a source system (e.g., a vendor server) and an analytics platform.

Figure 1:
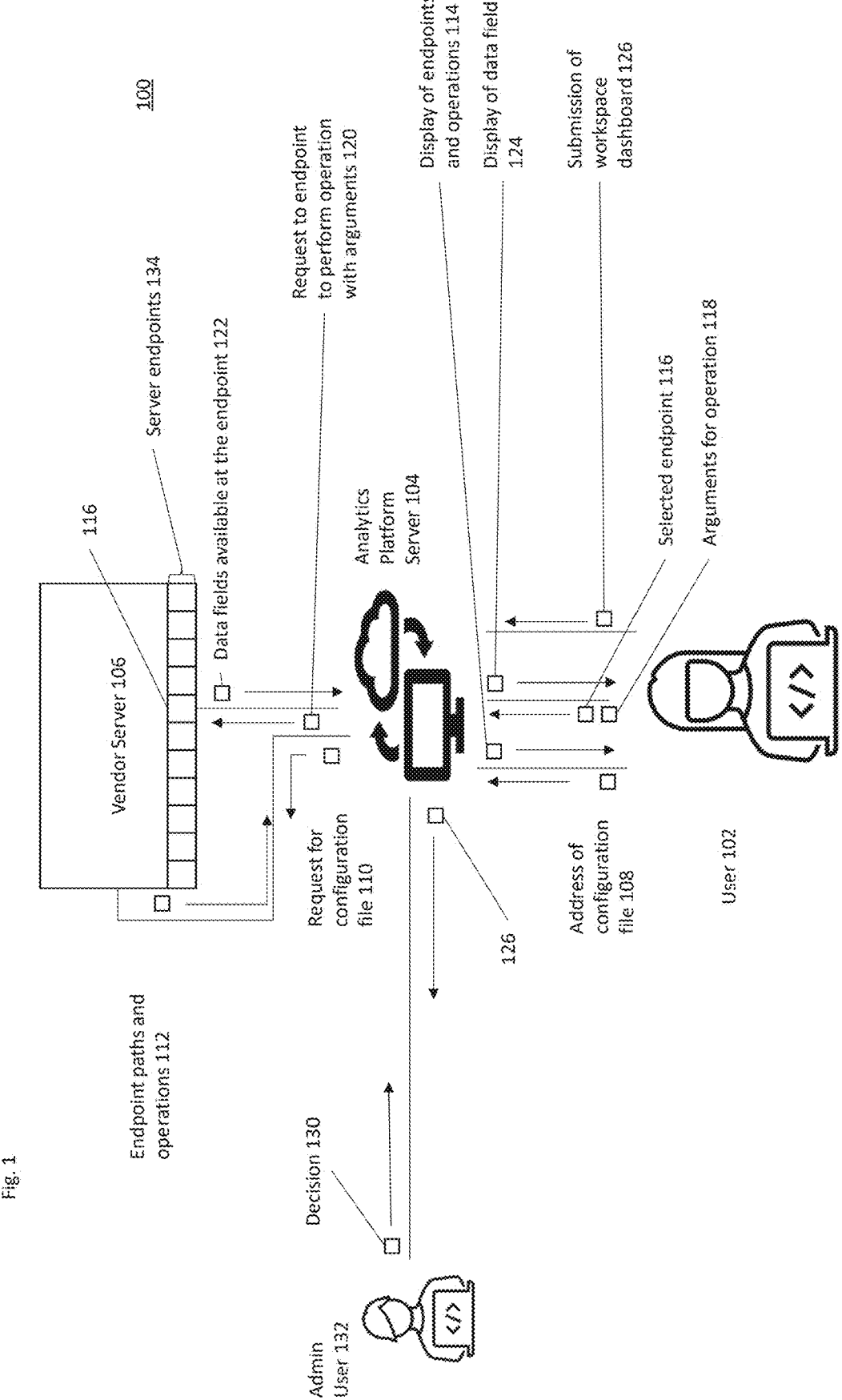
FIG. 1 is a block diagram of a method of generating an integration template to interact with a vendor server according to embodiments of the present disclosure.

FIG. 1 is a block diagram 100 of generating an integration template to interact with a vendor server 106 according to embodiments of the present disclosure. A user 102 interacting with an analytics platform server 104 begins creating a template by providing an address of a configuration file 108 to the analytics platform server 104. It can be appreciated that the analytics platform server 104 can receive the address of the configuration file 108 from other sources other than the user 102. In addition, it can be appreciated that the configuration file referenced by the address 108 is a Swagger or YAML Ain't Markup Language (YAML) file. In response to receiving the address of the configuration file 108, the analytics platform server 104 sends a request for the configuration file 110 to a vendor server 106. In response, the analytics platform server 104 receives endpoint paths and available operations 112 generated by the vendor server 106 in response to receiving the request for configuration file 110. It can be appreciated that the vendor server 106 has available one or more server endpoints 134 for other servers to interact with data available at those endpoints 134.

The analytics platform server 104 provides a display of endpoints and operations 114 available at the vendor server 106. The analytics platform server then receives a selected endpoint 116 and an argument for an operation 118. It can be appreciated that the selected endpoint 116 can be one or more selected endpoints and the argument for the operation can be one or more arguments for one or more operations. The analytics platform server 104 then provides a request 120 to the selected endpoint 116 to perform the operation with the arguments 118. The analytics platform server 104 receives, in response to the request 120, data fields 122 available at the endpoint.

The analytics platform server 104 then provides a display 124 of the data fields 122. The user 102 can select one or more of the data fields 122 to be included in a workspace dashboard 126. The workplace dashboard further includes the selected endpoint(s) 116 and arguments for operation 118. The workplace dashboard can further include additional arguments, data manipulations such as fields, joins, formulas, and filters, and/or any information representing data fields illustrated in FIGS. 2-8.

In response to providing the display, the analytics platform server 104 receives a submission of the workspace dashboard 126. The submission to the workspace dashboard 126 can include the arguments operation to send to the endpoint at the server 106 and one or more data fields 122 to be accessed by the submission. In some embodiments, the submission 126 includes additional information, such as operations on the data fields like joins, formulas, or filters, descriptions of data fields, currency labels, or unit conversion metadata.

The analytics platform server 104 receives the submission 126 and forwards it to an administrative user 132 (e.g., admin, administrator, super user, etc.) that reviews the submission 126 for efficacy, security, errors, etc. The admin user 132 can issue a decision 130 on the submission after review. The decision 130 can be an approval, which causes the submission 126 of the integration to be published for other users to access. Thereby, other users can use the published integration to access the data fields 122 available at the selected endpoint 116 at the vendor server 106.

In some embodiments, the integration provides an interface to a source system to manage a dataset, the dataset including incoming data from the source server. The integration manages the data with data management policies.

In some embodiments, a workspace includes data from one or more datasets. The workspace can perform preprocessing on the multiple datasets, such as joining data, calculating metrics, or other operations.

In some embodiments, a dashboard provides one or more gauges, which provide visualizations of the workspaces or dashboards.

Figure 2:
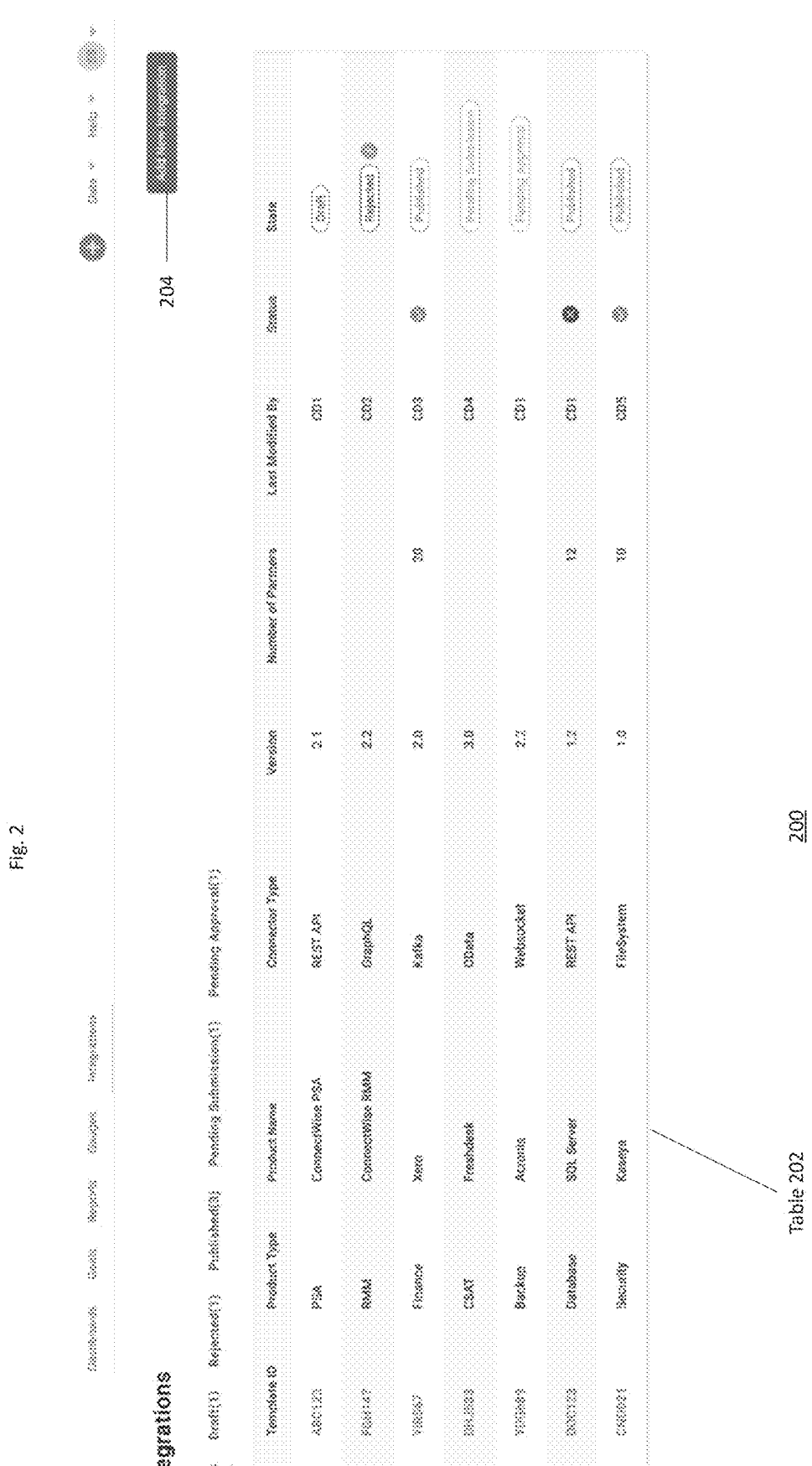
FIG. 2 is a user interface according to embodiments of the present disclosure.

FIG. 2 is a diagram 200 of a user interface according to embodiments of the present disclosure. In some embodiments, the user interface provides a table 202 showing integrations submitted for publication at an analytics platform. The table illustrates, for example, an identifier of each integration, a product category, a product name, a connector type (e.g., REST API, GraphQL, Kafka, OData, Websocket, FileSystem, etc.) a version number of the integration, a number of users that use the integration (if published), the last user to modify the integration, a status of the integration, and a state of approval of the integration. It can be recognized that an administrator user of the system uses this interface to review, approve, or reject proposed integrations. In some embodiments, an administrator user of the system can monitor statuses of published integrations and can use the interface to troubleshoot integrations that are down. In some embodiments, a non-administrator user can use the user interface, but may have limited permissions, such as being able to view integrations which that user has permissions to view. The user interface further provides a control 202 to access an add new integration interface.

Figure 3A:
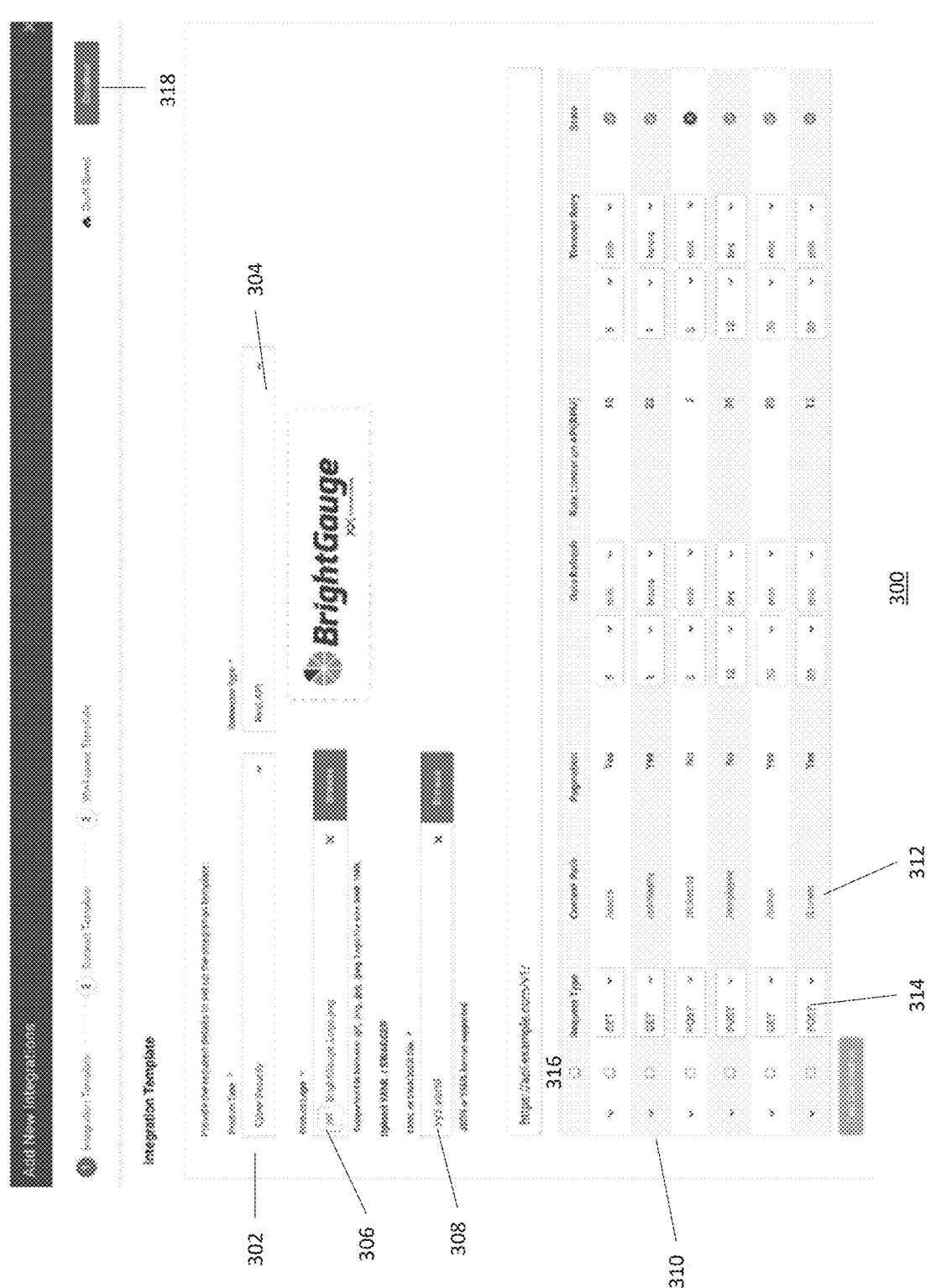
FIG. 3A is a user interface for generating an integration template according to an embodiment of the present disclosure.

FIG. 3A is a user interface 300 for generating an integration template employed by embodiments of the present disclosure. The user interface of FIG. 3 provides the ability to add an integration and gather endpoints and operations available at a server. An address of configuration file 308 (e.g., a YAML or SWAGGER file) is provided to the user interface. Upon being provided, the system retrieves the configuration file from the server to request and retrieve endpoint information illustrated in table 310, such as a request type and context path. In some embodiments, the system applying the configuration file can request and retrieve the product type field 302, connector type 304, and product logo 306. In some embodiments, the product type field 302, connector type 304, and product logo 306 can be populated by a user. It can be appreciated that the connector type 304 can be one or more of REST API, GraphQL, Kafka, OData, Websocket, OpenAPI, and FileSystem.

In some embodiments, the table 310 provides a row for each context path provided by the server. The request types 314 (e.g., an operation) can include the HTTP methods such as GET, POST, PUT, PATCH, DELETE. The context paths 312 are endpoints that provide access to data available at the server. The table 310 further includes controls for adjusting a data refresh rate for each context path 312, a rate limiter field, a timeout retry control, and a state monitor. Each row further has a selection control 316 that allows selecting of each context path and request type to be part of the integration. A continue control 318 proceeds to a next stage of integration creation, using the selected 316 context paths 312 and request types 314.

Figure 3B:
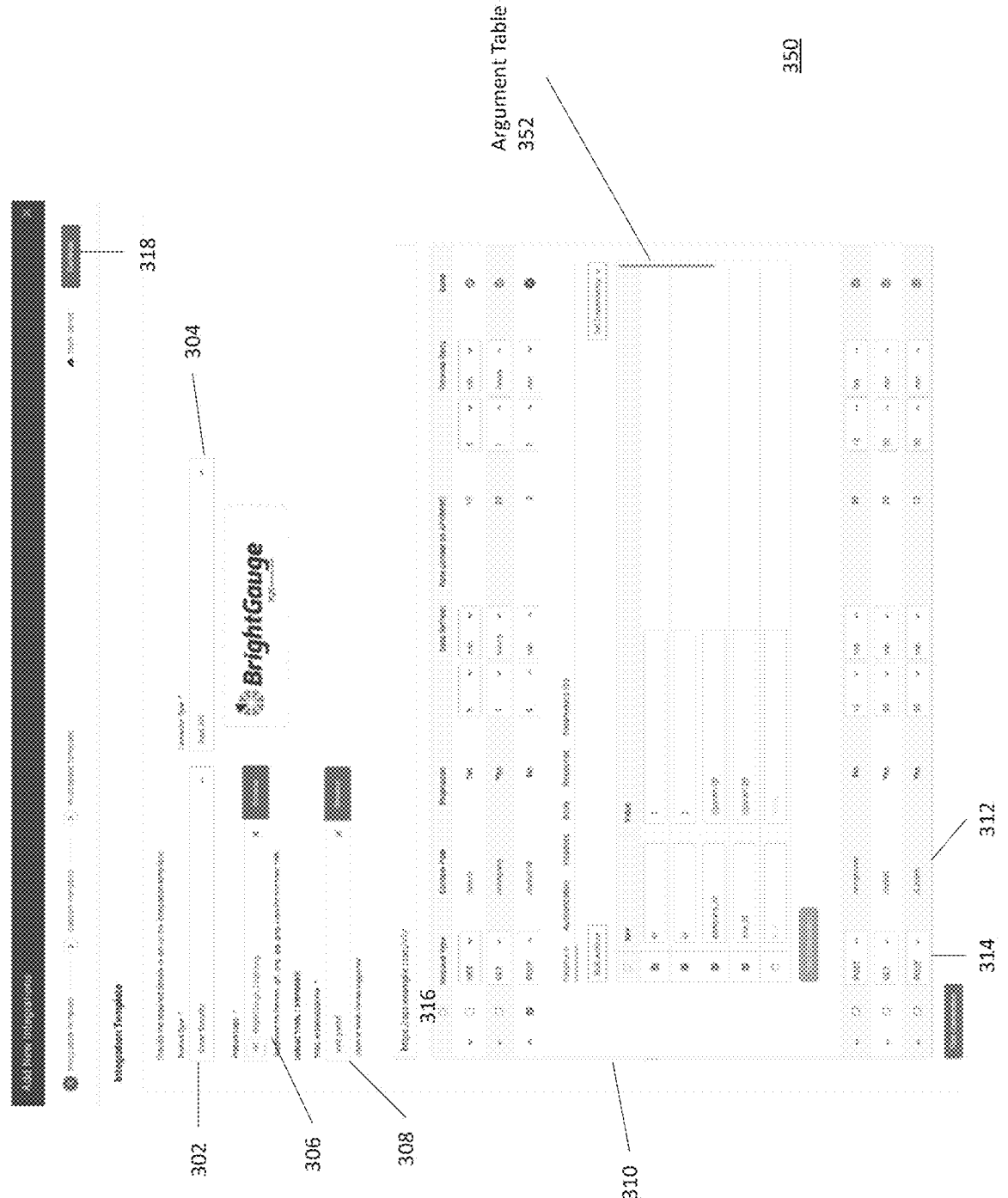
FIG. 3B is a user interface for generating an integration template according to embodiments of the present disclosure.

FIG. 3B is a user interface 350 for generating an integration template employed by embodiments of the present disclosure. The user interface of FIG. 3B is similar to the user interface of FIG. 3A, but one of the context path entries is expanded to display an argument table 352. The argument table 352 provides arguments such as keys and corresponding values, authorization, headers, body information, response information, and parameters to supplement the HTTP Request for the context path that is expanded in the user interface. In FIG. 3B, the argument table 352 shows keys and values to accompany the operation request.

Figure 3C:
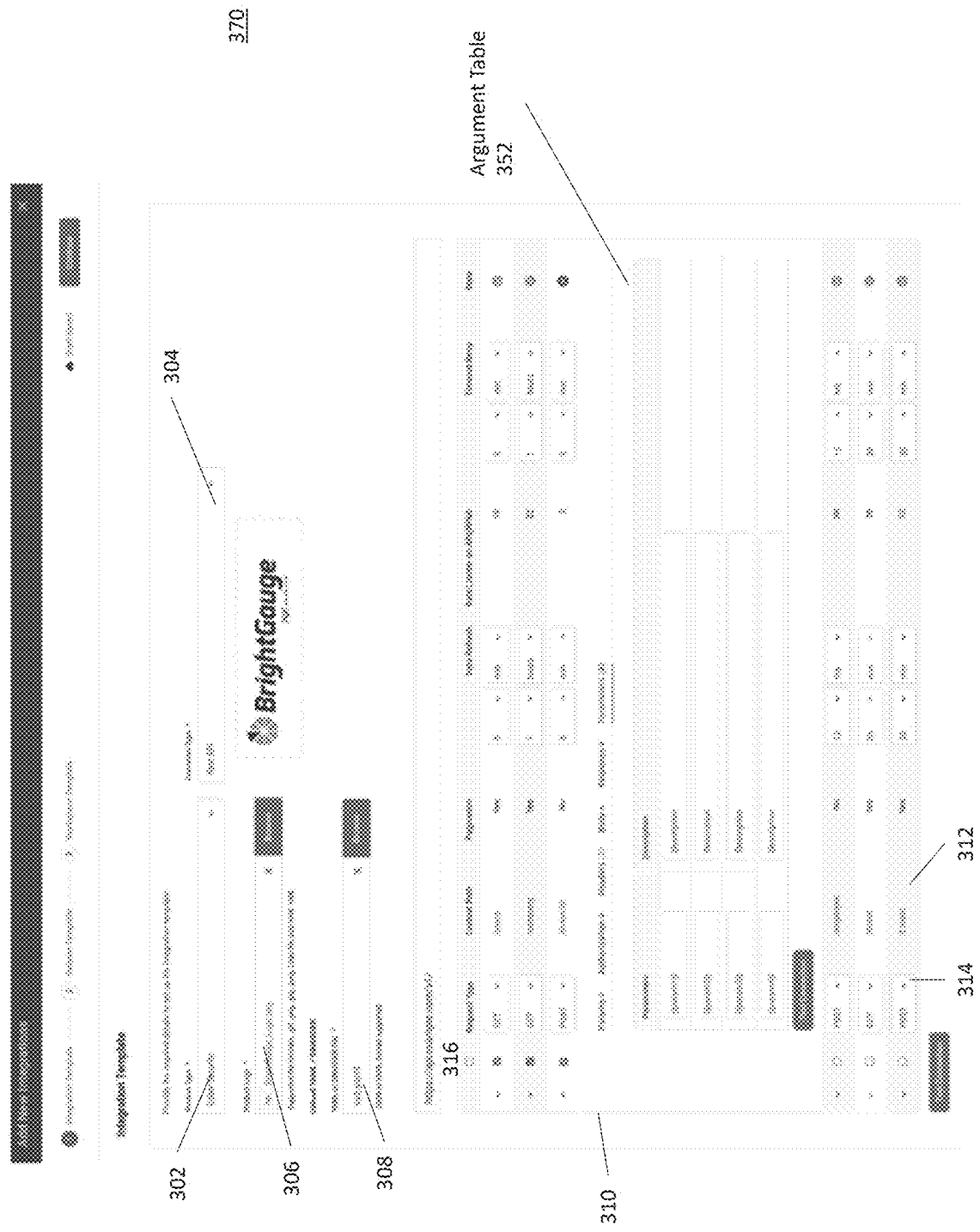
FIG. 3C is a user interface for generating an integration template employed by embodiments of the present disclosure.

FIG. 3C is a user interface 370 for generating an integration template employed by embodiments of the present disclosure. The user interface of FIG. 3C is similar to the user interface of FIGS. 3A-B, but one of the context path entries is expanded to display an argument table 372. The argument table 352 provides arguments such as keys and corresponding values, authorization, headers, body information, response information, and parameters to supplement the HTTP Request for the context path that is expanded in the user interface. In FIG. 3C, the argument table 372 shows parameters to accompany the operation request.

Figure 4A:
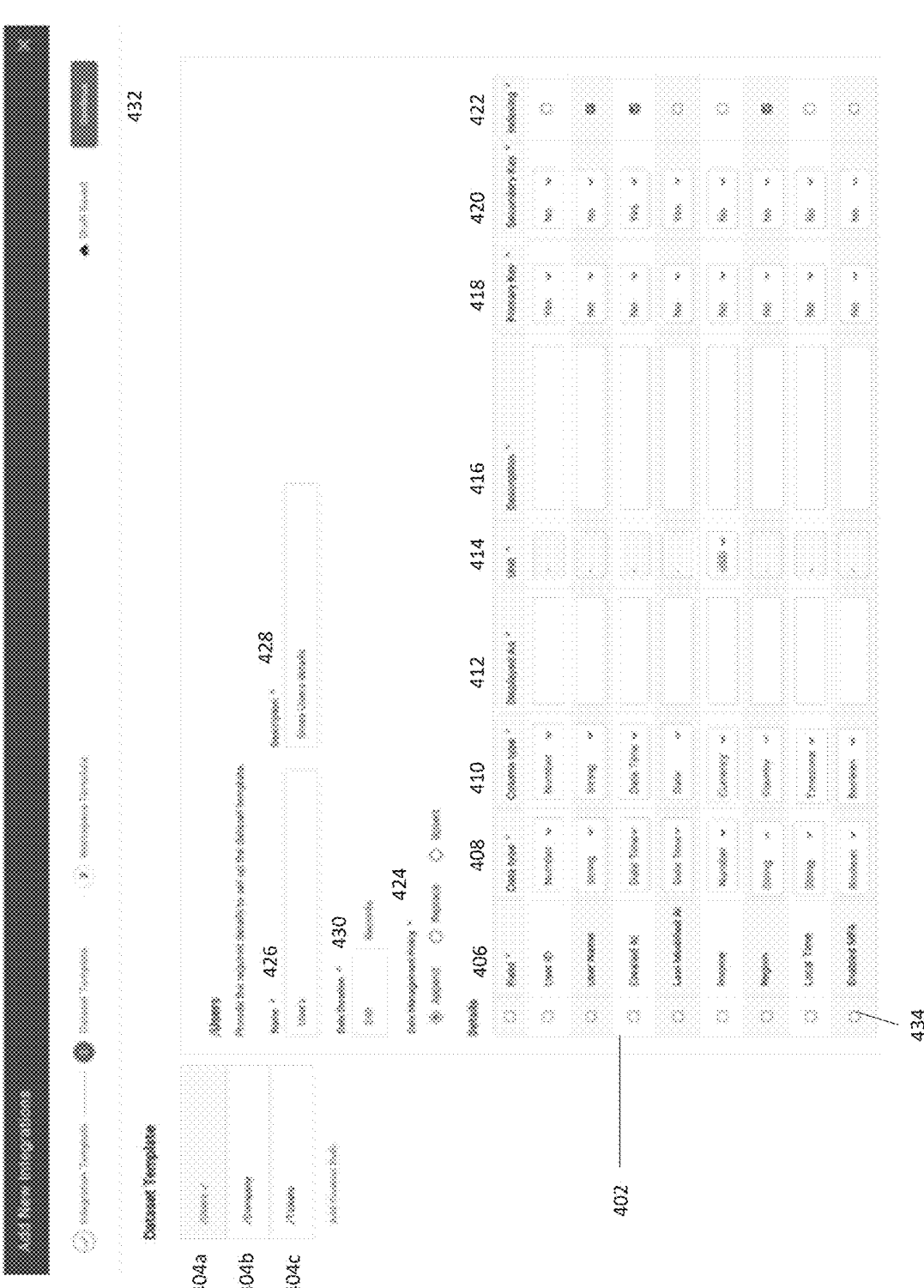
FIG. 4A is a user interface for generating a dataset template employed by according to embodiments of the present disclosure.

FIG. 4A is a user interface 400 for generating a dataset template employed by embodiments of the present disclosure. In some embodiments, the user interface 401 provides a dataset template table 402 having a plurality of data fields 406 available at a selected context path 404a of the displayed context paths 404a-c. In some embodiments, the table 402 displays fields including one or more of field name 406, data type 408, column type 410, displayed as 412, unit 414, description 416, primary key 418, secondary key 420, indexing 422. In some embodiments, the table 402 displays a row for each field 406. The data type field 408 can include a control for selecting a type of the data for the field 406 indicated by the row, where the type of data can include a number, a string, a date, a time, a date and time, a Boolean, a hexadecimal value, or other type. The column type field 410 can include a control for selecting a type of the data for the field 406 indicated by the row, where the type of data can include a number, a string, a date, a time, a date and time, a Boolean, a hexadecimal value, or other type. The displayed as field 412 and description field 416 can each be a string entry field. The unit field 414 can be a control for selecting units, such as currency, weight, length, time, volume, voltage, current, power, or any other unit. The primary key field 418 and secondary key field 420 can each be Boolean selection controls. The indexing field 422 can be a Boolean selection control such as a checkbox.

In some embodiments, the user interface 401 provides an input field for a dataset name 426, dataset description 428, a data duration field 430, and a data management policy 424. In some embodiments, the data duration field 430 provides for customization of how many records each dataset or field stores. In some embodiments, the data duration field can provide a time based data expiration, such as removing records that were last updated over threshold number of days/weeks/months ago.

The table 402 further can include a selection control 434. The selection control 434 selects fields 406 of the table for being included in the workspace template. The fields 406 selected by the selection control 434 when the continue control 432 are provided to the next stage of workspace template design.

Figure 4B:
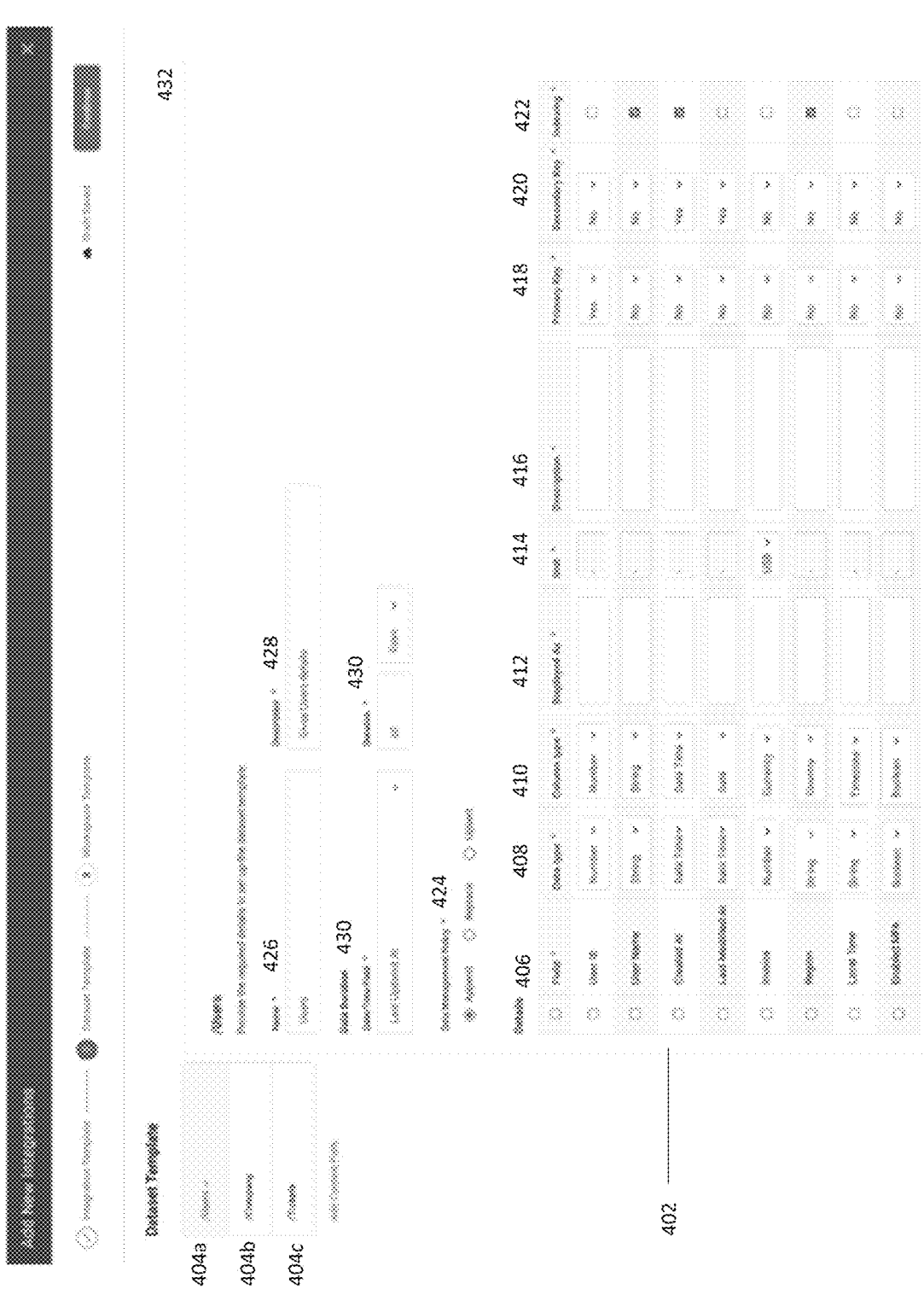
FIG. 4B is a user interface for generating a dataset template according to embodiments of the present disclosure.

FIG. 4B is a user interface 450 for generating a dataset template employed by embodiments of the present disclosure. In some embodiments, the user interface 450 of FIG. 4B is similar to the embodiments of the user interface 400 describe in relation to FIG. 4A. In some embodiments, the data management policy 424 can be a control providing for appending, replacing, or inserting the data.

Figure 5:
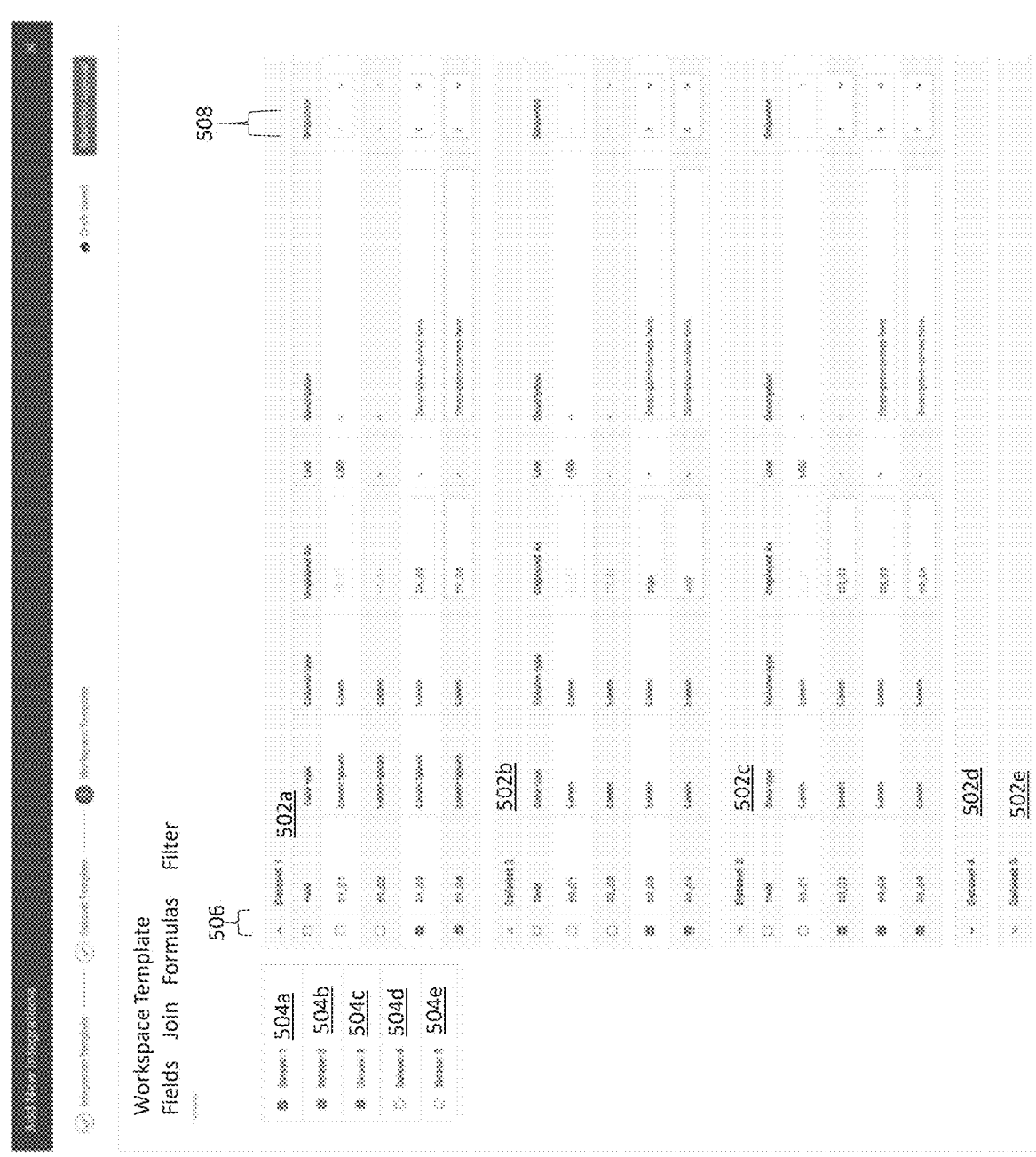
FIG. 5 is a user interface for generating a workplace template according to embodiments of the present disclosure.

FIG. 5 is a user interface 500 for generating a workplace template employed by embodiments of the present disclosure. In some embodiments, user interface 500 provides one or more dataset selection controls 504*a-e*. In some embodiments, when a particular dataset control 504*a-e* is selected, the corresponding dataset 502*a-e* is shown expanded in the user interface. For example, when dataset selection controls 504*a-c* are selected, data sets 502*a-c* are shown to be expanded. Continuing the example, when dataset selection controls 504*d-e* are not selected, data sets 502*d-e* are shown to be collapsed.

The user interface 500 can provide for selecting, via a control 506, individual fields of the dataset 502*a-e* to be part of the workspace. The user interface 500 can provide for inputting, via a control 508, a sequence or order of display of each field in the workspace.

Figure 6:
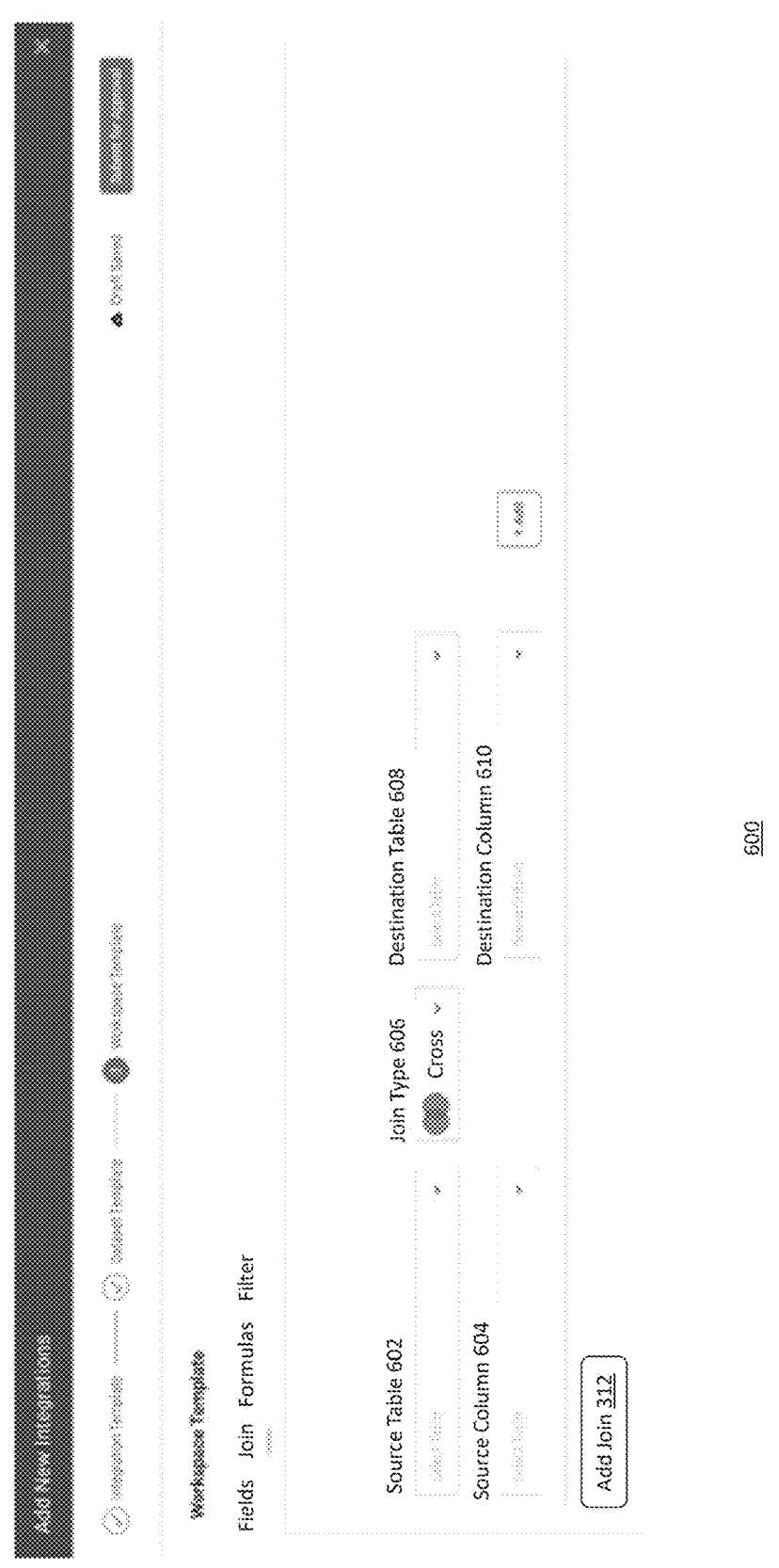
FIG. 6 is a user interface for generating a workplace template having joined data according to embodiments of the present disclosure.

FIG. 6 is a user interface 600 for generating a workplace template having joined data employed by embodiments of the present disclosure. In some embodiments, the user interface 600 provides for a join operation between a source table 602, source column 604, destination table 608, and destination column 610. The user interface can provide for a join type 606. In some embodiments, the join type 606 can include inner join, outer join, left outer join, right outer join, full outer join, cross join, self join, or a combination of the above. The user interface 600 can also provide an add control 612, which allows for multiple join operations to be added to the workplace.

Figure 7:
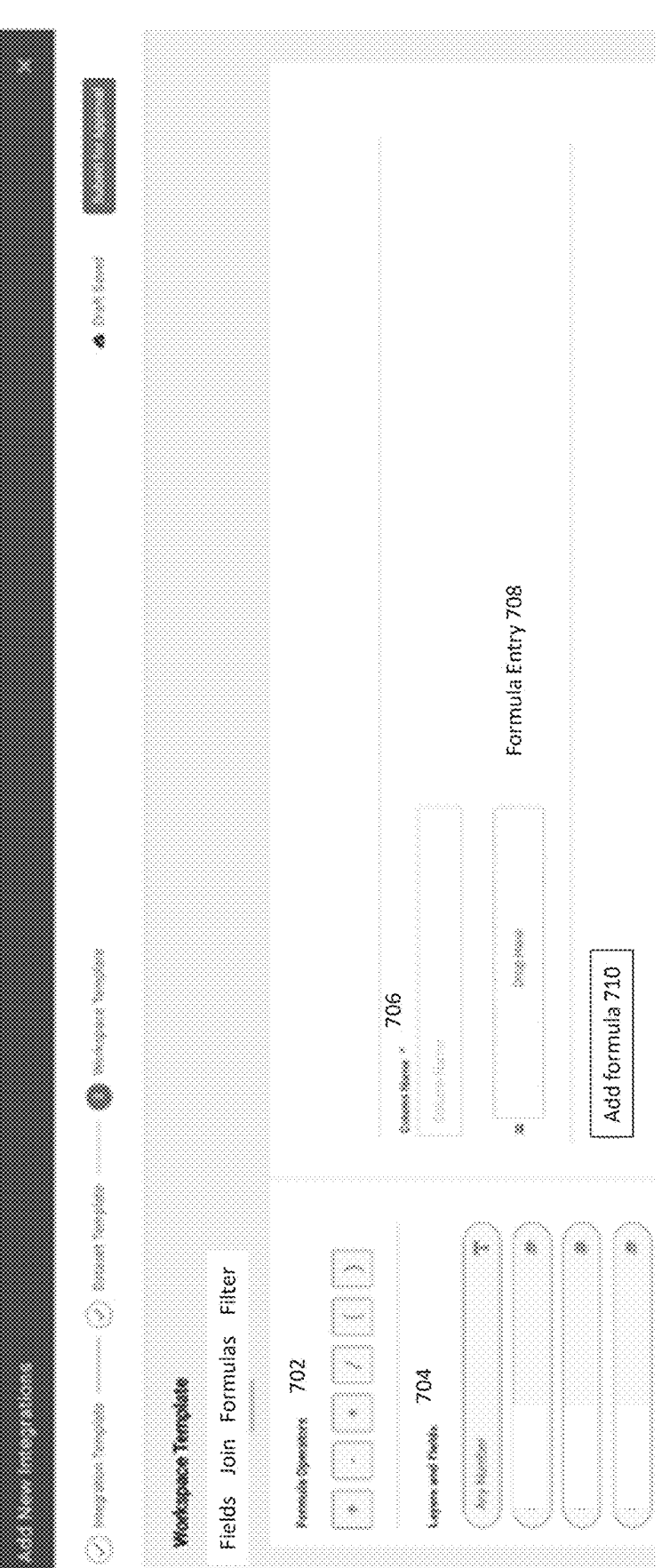
FIG. 7 is a user interface for generating a workplace template having a formula column according to embodiments of the present disclosure.

FIG. 7 is a user interface 700 for generating a workplace template having a formula column employed by embodiments of the present disclosure. The user interface 700 can display formula operators 702 including, but not limited to, addition (+), subtraction (−), multiplication (*), division (/), and parentheses or brackets. In some embodiments, the user interface also displays available layers and fields 704 of the data set (e.g., the selected fields illustrated in FIG. 5). The user interface 700 can display a column name 706 for the column having the result of the formula. The formula can be entered in the formula entry field 708. In some embodiments, the formula can be entered by dragging one or both of the formula operators 702 and layers and fields 704 to the formula entry field 708. In some embodiments, the formula can be entered by typing the formula operators and/or layers and fields to the formula entry field. An add formula control 710 can add the formula of the formula entry field 708 to the workspace. In some embodiments, upon adding the formula to the workspace, an additional formula entry field 708 and column name 706 is provided to add an additional formula.

Figure 8:
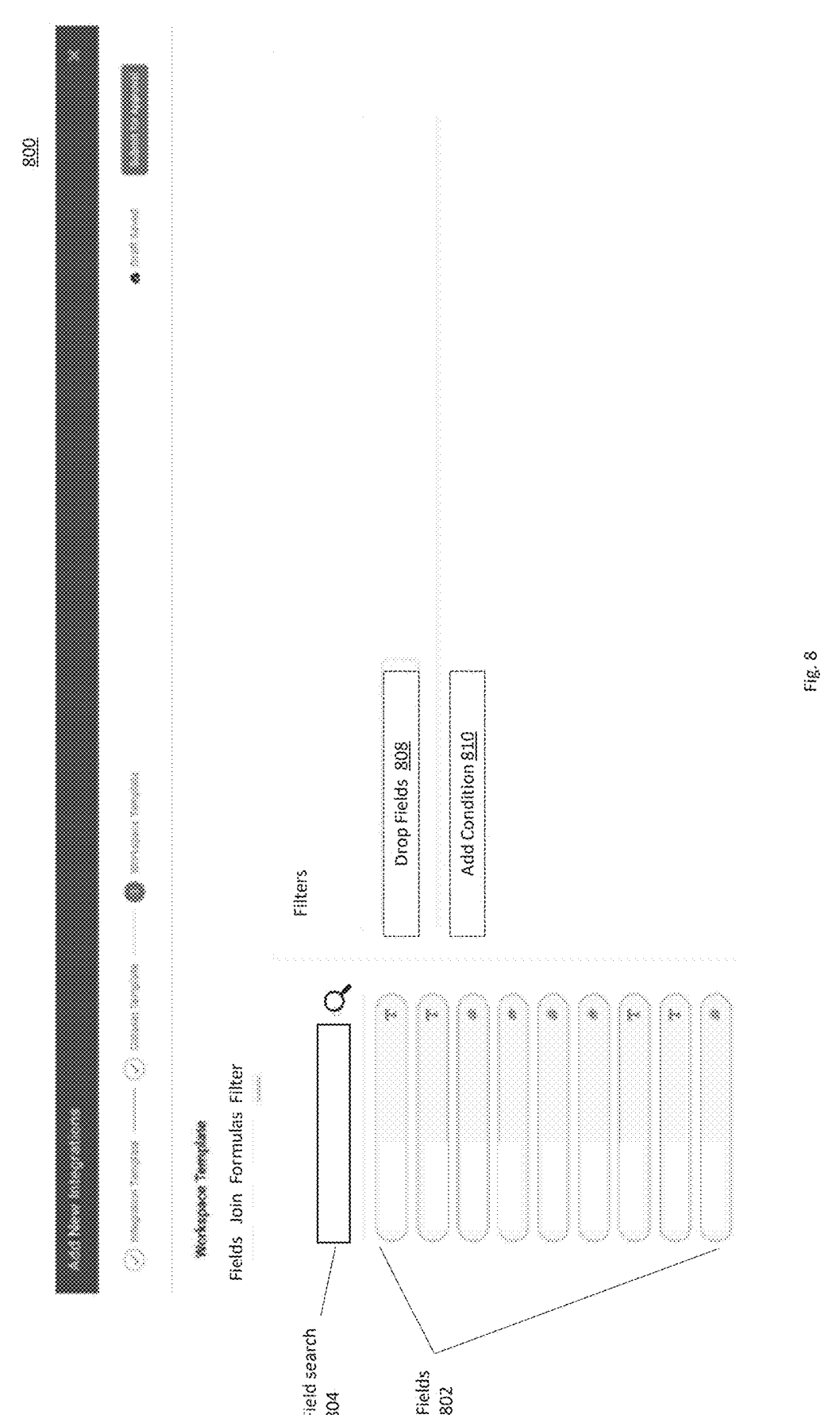
FIG. 8 is a user interface for generating a workplace template having a formula column according to embodiments of the present disclosure.

FIG. 8 is a user interface 800 for generating a workplace template having a formula column employed by embodiments of the present disclosure. The user interface 800 can display fields 802 and a field search input 804. In some embodiments, a drop fields control 808 receives fields 802 that are selected and dragged to the control 808. Once a field is dropped, a condition 810 can be added to filter the control (e.g., greater than, less than, equal to, starts with, ends with, contains, etc.). In some embodiments, the drop fields control 808 can receive a string having a name of a field.

In some embodiments, with reference to FIGS. 5-8, each of the user interfaces 500, 600, 700, and 800 can be viewed in any order, and a user can also omit viewing one or more of these user interfaces. A respective submit for approval control 550, 650, 750, and 850 is provided in respective user interfaces 500, 600, 700, and 800. Upon selection of the approval control 550, 650, 750, and 850, the workspace including any selected fields, any join operations, and formula columns, and any filters are submitted to an administrator user. In some embodiments, the workspace can include any combination of the selected fields, join operations, formula columns, and filters. In some embodiments, the workspace does include the selected fields, and also includes any combination of the join operations, formula columns, and filters.

FIG. 9A is a flowchart 900 illustrating a method of creating a new integration according to embodiments of the present disclosure. In some embodiments, the method initiates creating a new integration 902, for example, after a user opens an integration creation user interface. The method can add endpoints or context paths for a new source server 904 based on a provided YAML, SWAGGER, or other configuration file. The method can create a dataset template defining field attributes and scheme 906. The method can create a default workspace template defining transformation for viewing one or more datasets 908. The method can create gauge templates that define metrics for visualization 910 (e.g., graphs, meters, or other manners of displaying data from the workspace template). The method can further request publication of the integration 912. The method can then approve or reject the integration 914 (e.g., by an administrator user).

FIG. 9B is a flowchart 920 illustrating a method of creating a new integration according to embodiments of the present disclosure. In some embodiments, the method receives a network address of a configuration file that includes parameters to interface with a server over a network 922. The method can extract, from the configuration file, a plurality of endpoints and one or more operation available to send to the server to manipulate each endpoint 924. The method can display, in a web interface, a first table having a plurality of rows 926. Each row can display (a) a given endpoint of the plurality of endpoints and (b) a menu for selecting a given operation of the one or more operation available to send to the server to manipulate the given endpoint. The method can, upon selection of a given row of the plurality of rows of the first table, display, in the web interface, one or more input fields 928. The input fields, for the given operation to send to the server to manipulate the given endpoint, can accept one or more of parameter, authorization, header, body, and response data. The method can gather, from the server, a plurality of data fields available at the given endpoint 930. The method can display, in the web interface, a second table having a plurality of rows 932. Each row can have one of the plurality of data fields, and inputs for one or more of data type, column type, a display name, unit, description, primary key, secondary key, and an indexing toggle. The method can display, in the web interface, a third table having a plurality of rows 934. Each row can have one of the plurality of data fields and a toggle for including the data field in a workspace dashboard 934. The method can display, in the web interface, data operation inputs 936. The data operation inputs can include at least one of a table joining input, a data formula input, and a data filter input. The method can receive a submission of the workspace dashboard to be published 938. The workspace dashboard can be defined by (a) the given operation to send to the server to manipulate the given endpoint, and the one or more of parameter, authorization, header, body, and response data, (b) the plurality of data fields selected by the third table, and one or more of data type, column type, a display name, unit, description, primary key, secondary key, and an indexing toggle, or (c) the data operation inputs.

Figure 9C:
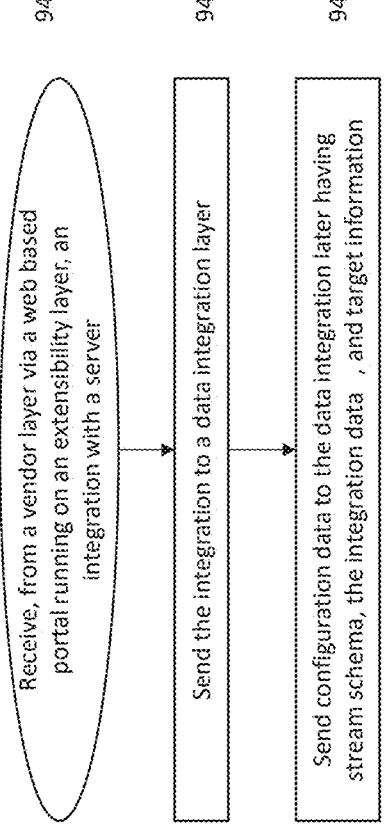

FIG. 9C is a flowchart 940 illustrating a method of creating a new integration according to embodiments of the present disclosure. In some embodiments, the method receives from a vendor layer via a web based portal running on an extensibility layer, an integration with a server, the integration including an endpoint schema of the server, a plurality of data fields, one or more data refresh intervals and an authentication mechanism 942. The method can send the integration to a data integration layer 944. The method can further send configuration data to the data integration layer 946.

FIG. 9D is a flowchart 950 illustrating a method of creating a new integration according to embodiments of the present disclosure. In some embodiments, the method receives a network address of a configuration file that includes parameters to interface with a server over a network 952. The method can extract a plurality of endpoints and one or more operation available to send to the server to manipulate each endpoint 954. The method can create an integration template 956. The integration template can include one or more of (a) a given endpoint of the plurality of endpoints, (b) a given operation of the one or more operation available to send to the server to manipulate the given endpoint, and (c) one or more input fields for the given operation to send to the server to manipulate the given endpoint. The one or more input fields can include a parameter, authorization, header, body, and response data. The method can create a data template including a plurality of data fields available at the given endpoint 958. The method can link the data template to the integration template 960. The method can create a workspace template 962. The workspace template can have at least one manipulation of the plurality of data fields of the data template, the at least one manipulation being one or more of a table joining operation, a data formula operation, and a data filter operation.

FIG. 9E is a flowchart 970 illustrating a method of creating a new integration according to embodiments of the present disclosure. In some embodiments, the method includes generating an integration template having metadata and a integration template identifier 972. The method can generate a dataset template having a data field template, a dataset template identifier, and the integration template identifier 974. The method can instantiate, using the integration template, an integration having the integration template identifier and the metadata 976. The method can instantiate, using the dataset template, a dataset having the dataset template identifier, a dataset identifier, and a data field corresponding to the data field template, the dataset being stored in a memory and indexed by the dataset identifier 978. The method can read, from a data source accessed using the metadata of the integration, the data field of the dataset 980. The method can store the read data field in the memory 982.

Figure 10:
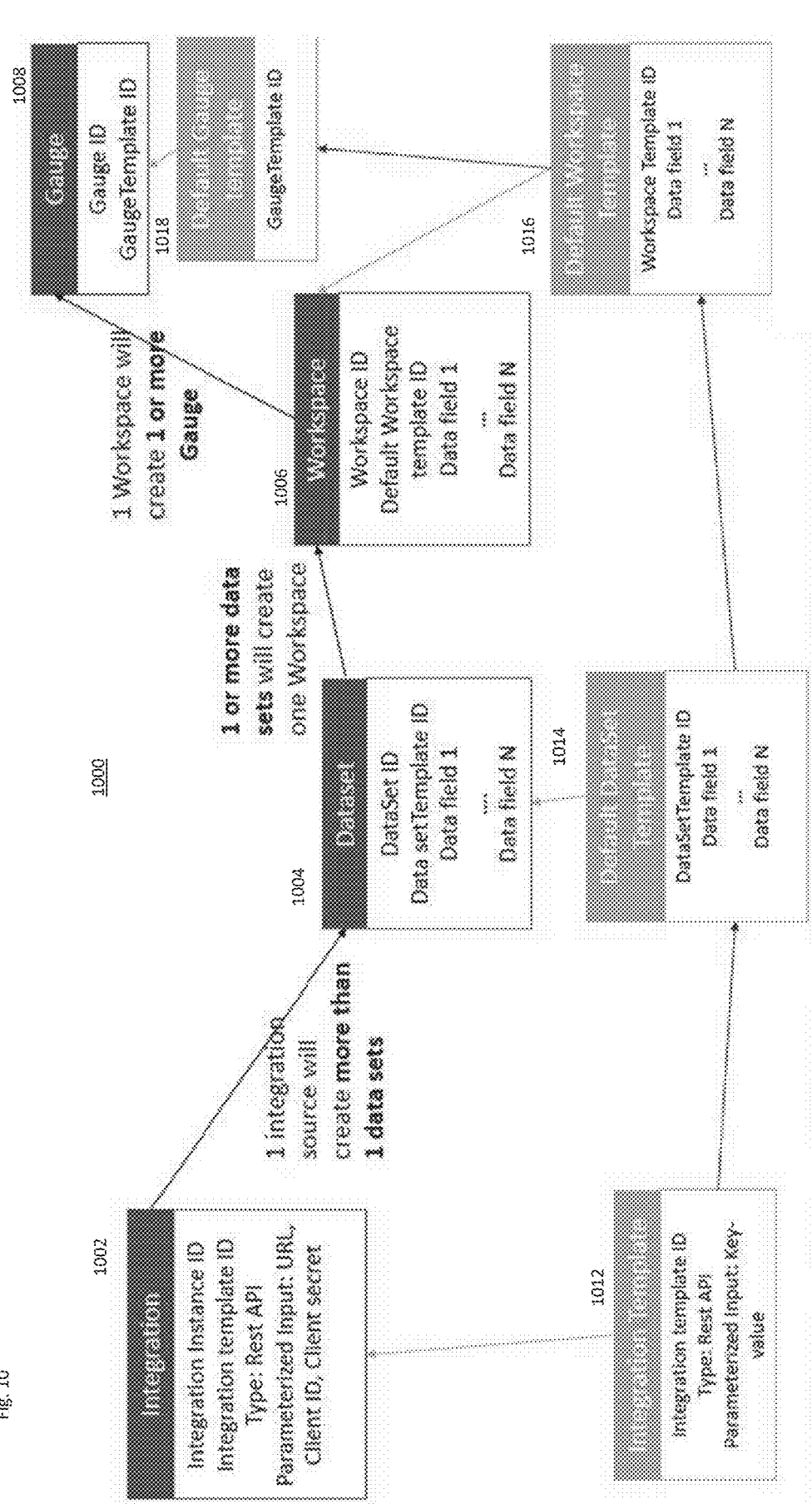
FIG. 10 is an architectural diagram of an integration according to embodiments of the present disclosure.

FIG. 10 is an architectural diagram 1000 of an integration according to embodiments of the present disclosure. In some embodiments, integration 1002 is generated based on an integration template 1012. In some embodiments, the integration template includes an integration template identifier, a type of connector (e.g., RestAPI, etc.) and a parameterized input having a key value. The integration template 1012 can be linked to one or more dataset templates 1014, one or more workspace templates 1016, and one or more gauge templates 1018.

Upon creating an integration 1002 with a source, the system can create one or more data 1004 corresponding with the one or more dataset templates 1014 associated with the integration template 1012. The dataset template 1014 can include a dataset template identifier and one or more dataset data fields. The dataset 1004 can include a dataset identifier, the dataset template ID of the dataset template 1014 of which the dataset 1004 is instantiated, and the dataset data fields and their values downloaded from the source server.

Upon creating a dataset 1004, the system can create one or more workspace 1006 corresponding with one or more workspace templates 1016. The workspace template 1016 can include a workspace template identifier, and one or more workspace data fields. The workspace 1006 can include a workspace identifier, a workspace template identifier of the workspace template 1016 of which the workspace 1006 is instantiated, and one or more workspace data fields. In some embodiments, the one or more workspace data fields are data fields from one or more of the datasets 1004.

In some embodiments, upon creating a workspace 1006, the system creates one or more gauge 1008 based on a gauge template 1018. The gauge template 1018 includes a gauge template identifier and corresponds with a gauge module for visualizing data. The gauge includes the gauge identifier and the gauge template identifier of the gauge template 1018 of which the gauge 1008 is instantiated. The gauge 1008 can be displayed on in the workspace as a way of visualizing data. In some embodiments, a gauge can be a number, a color coded number, a meter, a table, a graph, or other representation of data.

Figure 11:
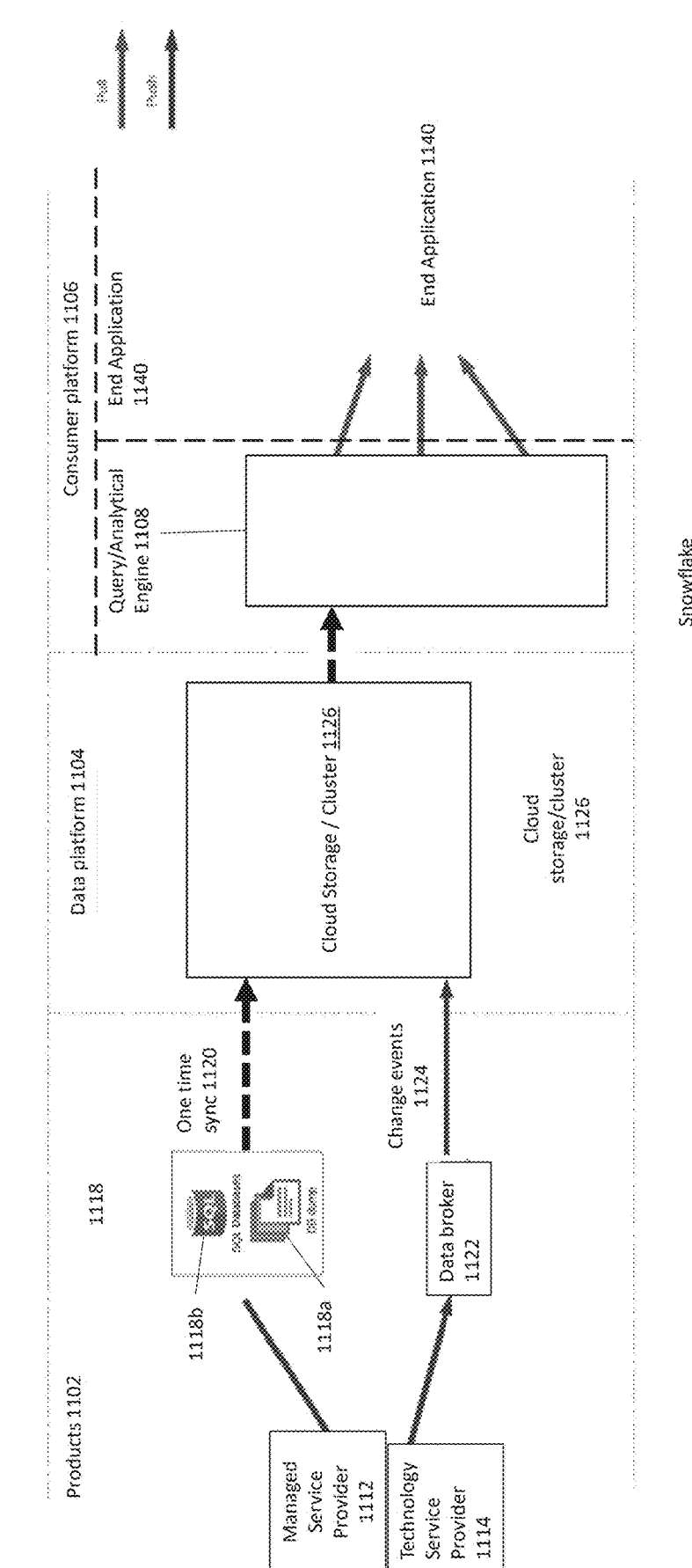
FIG. 11 is an network diagram of an interaction system interacting with a data platform and products according to embodiments of the present disclosure.

FIG. 11 is an network diagram 1100 of an interaction system 1140 interacting with a data platform 1104 and products 1102 according to embodiments of the present disclosure. In some embodiments, a data platform 1104 is a common point of interface for integration. In some embodiments, the consumer platform 1106 does not employ internal data stores to implement integrations. In some embodiments, the consumer platform 1106 does not perform ETL/sync jobs. In some embodiments, the consumer platform 1106 issues queries to the source. These queries can refresh the consumer platform 1106. The consumer platform 1106 therefore can efficiently provide data visualizations without needing to spend processing time and memory resources on gathering.

In some embodiments, the product platform 1102 ensures that appropriate service events are emitted on the message broker for the data platform 1104 to consume. In some embodiments, one or both of ConnectWise® RMM 1112 and ConnectWise Manage® 1114 provide a one-time sync 1120 of database 1118 to the cloud storage/cluster 1126 (e.g., via a pull-operation). In some embodiments, one or both of ConnectWise® RMM 1112 and ConnectWise Manage® 1114 communicate entity changes with a message broker (e.g., data streaming module) via a data push operation. In some embodiments, one or both of ConnectWise® RMM 1112 and ConnectWise Manage® 1114 takes about 200 milliseconds or fewer to emit the entity changes on the message broker. The change events 1124 can be further communicated to the cloud storage/cluster 1126 via a push operation. The change events 1124 can reflect a differential in the data of the one-time sync 1120, any previously sent change events 1124, and the current set of data. In some embodiments, the change events 1124 can be sent about 50 seconds or less, which includes a 10 second delay between micro-batches and processing time to move data.

In some embodiments, the data platform 1104 handles changes streamed by the product platform 1102. The data platform 1104 can make data available in real-time or near real-time by streaming on the cloud storage/cluster 1126. In some embodiments, delta lake/iceberg or other data formats can be used, such as open-source storage formats. In some embodiments, a data architecture provides advantages processing and managing large volumes of data, including improving data consistency and reliability, data versioning, data organization, scalability (e.g., partitioning, indexing, and efficient metadata management), and data isolation (e.g., concurrently read/write of data).

In some embodiments, the consumer platform 1106 employs a query engine 1108 (e.g., a query/analytical engine) distributed SQL engine to query directly at a product platform 1104. In some embodiments, the query engine 1108 can query the iceberg/Delta lake files 1104 produced by the data platform 1106. In some embodiments, the communications between the data platform and the consumer platform 1106 are about 10 seconds or fewer. In some embodiments, the communications between the data platform 1104 and the consumer platform 1106 can represent a sum of a query execution and response time.

In some embodiments, the query engine 1108 can employ one or more SQL engines. In some embodiments, non-real time datasets such as ConnectWise® RMM (Remote Monitoring and Management) datasets can query directly, instead of pulling data into FDWs and querying from there. In some embodiments, the data of the query engine 1108 is pulled into the End Application 1140 about every 60 seconds, which represents a pull cadence to refresh dashboards. In some embodiments, other pull cadences can be used that are less than or greater than 60 seconds.

In alternative methods, API-based integrations use a pull-model to pull data for Cloud integrations and via agents. However, this model is not efficient because it requires infrastructure costs and reduces operational efficiency by queuing up a number of synchronization jobs, which causes delays. In addition, not all APIs are designed to provide differential data (e.g., having a last_updated_time field), so the integrator needs to pull the API's data in full every time. Further, API models are constrained by rate and size limitations. API's also have high enterprise-to-enterprise latencies and lack support for real-time historical data. APIs are popular because they are often times the only available way to pull data.

Figure 12A:
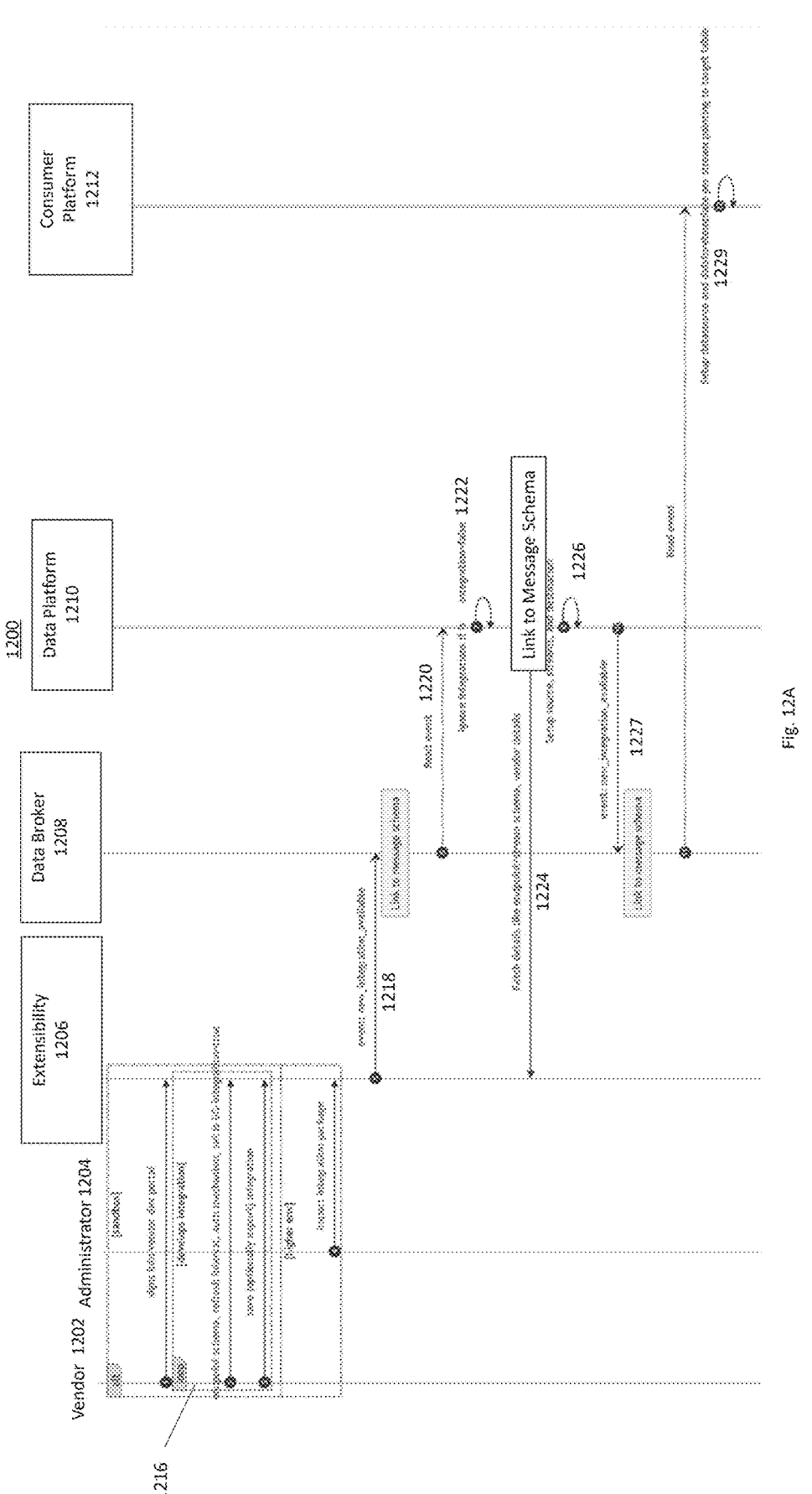
Figure 12B:
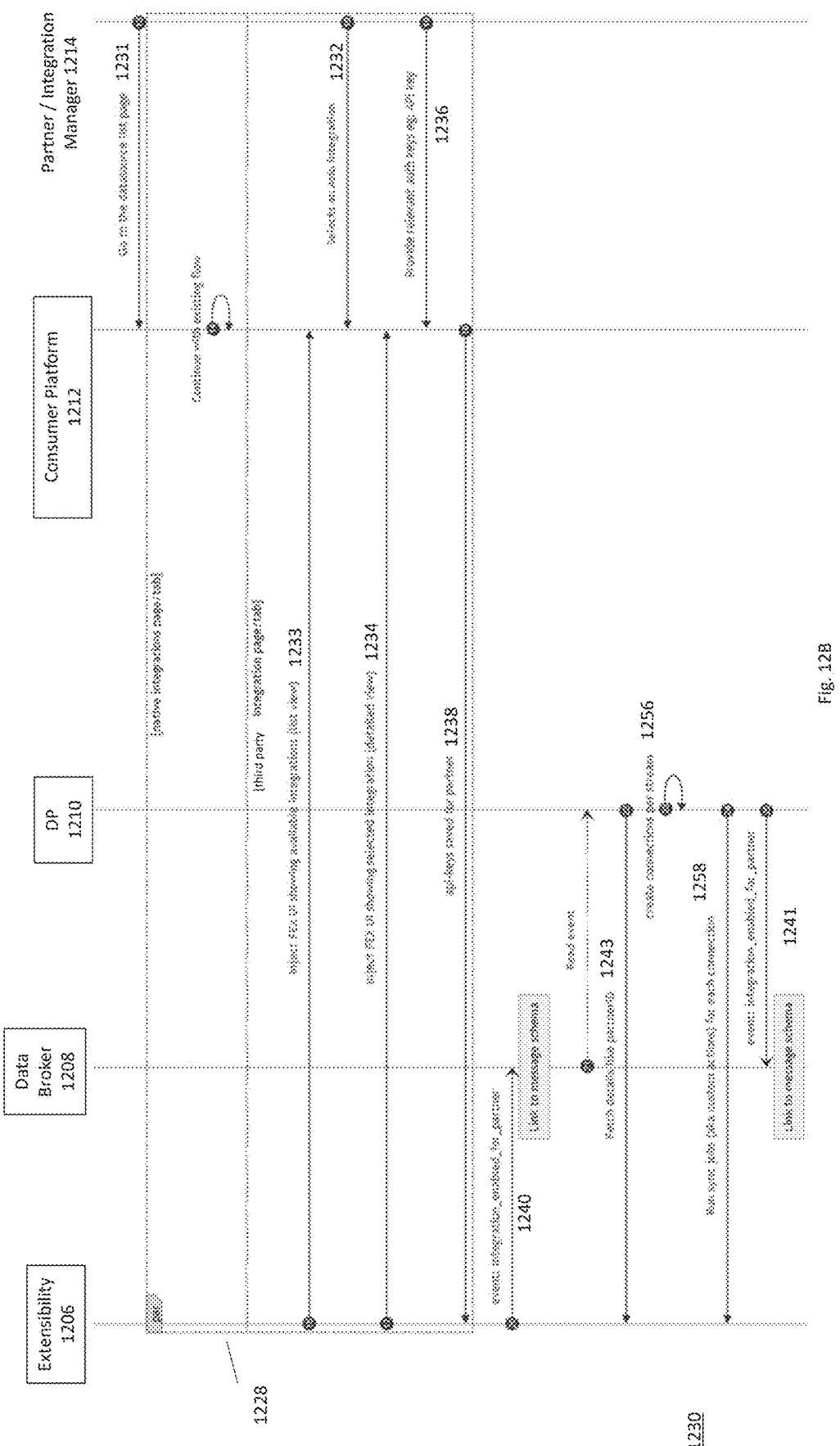

FIGS. 12A-C depict network diagrams 1200, 1230, and 1250 of creation and use of an integration in accordance with embodiments of the present disclosure. The diagrams 1200, 1230, and 1250 illustrate network actors including a vendor 1202, an administrator 1204, an extensibility layer 1206, a data broker 1208, a data platform 1210, a consumer platform 1212, and a partner/integration manager 1214. In some embodiments, each of the network actors can be implemented using one or more computers or servers.

FIG. 12A is a network diagram 1200 of creation of an integration in accordance with embodiments of the present disclosure. In some embodiments, an integration creation process 1216 includes multiple steps with the vendor 1202, the administrator 1204, and the extensibility layer 1206. In some embodiments, the vendor 1206, interacting with the extensibility later 1206, signs into a vendor development portal 1216-1. In some embodiments, and optionally in a loop, the vendor provides, to the extensibility later 1206, endpoint schema, a refresh interval, authentication mechanism, and a Boolean flag to enable the integration 1216-2. The vendor than saves 1216-3 the integration to the extensibility later 1206. An administrator 1204 can then import 1216-4 the integration package to the extensibility layer 1206.

In some embodiments, the extensibility layer 1206 sends to the data broker 1208, a "new integration available" event 1218. The new integration available even 1218 creates a link to a message schema at the data broker 1208. The data broker 1208 can read the event 1220 to the data platform 1210 and, if the Boolean flag is false, the data platform 1210 can ignore the event 1222. Otherwise, the data platform 1210 fetches details from the extensibility layer 1206 from a link to the message schema such as the endpoint, stream schema, vendor details, etc. 1224. The data platform further configures the source, streams, and destination in an integration platform 1226. The data platform 1210 can then send a new integration available event 1227 to the data broker 1208. The consumer platform 1212 then reads the link to the message schema and initializes the data source and data store template per stream pointing to the target table 1229.

FIG. 12B is a network diagram 1230 of use of an integration in accordance with embodiments of the present disclosure. In some embodiments, an integration can be accessed by a partner 1214 by visiting a data source list page 1231 available at a consumer platform 1212. The consumer platform 1212 checks for integrations 1228 by seeing if native integrations are available at the consumer platform 1212 and checking if integrations are available at the extensibility platform 1206. In some embodiments, the integrations are default, native, or built-in integrations, and/or third-party integrations. For third-party integrations, the extensibility layer 1206 injects a user interface (UI) to show available integration 1233 to the consumer platform 1232. The partner 1214 can then select, at the consumer platform 1212, an integration 1232. The extensibility layer 1206 responds by sending an injection of the UI (e.g., a MicroUI) showing the selected integrations delivered in the list 1234. The partner 1214 provides, to the consumer platform 1212, authentication keys such as an API key 1236. The consumer platform 1212 forwards the API keys to the extensibility layer 1206 to be saved for the partner user 1214. The extensibility layer 1206 sends to the data broker 1208, an event enabling the integration for the partner, thereby updating the message schema of the selected integration with the authentication data 1240.

Once the integration has authentication information, the data broker 1208 can read an event 1252 to the data platform 1210. The data platform 1210 fetches details like the partner ID 1254 from the extensibility layer 1206. The data platform 1210 then creates 1256 connections for each stream at the data platform 1210. In some embodiments, the data platform 1210 runs sync jobs (e.g., custom actions) for each connection 1258 at the extensibility layer 1206. The data platform 1210 sends an integration enabled for partner event 1241 to the data broker 1208.

FIG. 12C is a network diagram 1250 of use of an integration in accordance with embodiments of the present disclosure. FIG. 12C is a logical continuation of FIG. 12B.

In some embodiments, the data broker 1208 sends a read event 1254 to the partner 1214. In response, the partner 1214 instantiates a data store for each stream, and saves the data store and connection ID mapping 1255. The consumer platform can a loop 1260 for the integration. In some embodiments, the loop 1260 includes the consumer platform 1212 fetching all streams for all connectionIDs and destination table names for the integration from the data platform 1210.

In some embodiments, the consumer platform 1212 or partner 1214 creates a datastore template for each stream that points to a target table. The data store is the instantiated for the partner.

In some embodiments, the partner 1214 creates a default API dataset, view dataset, gauges, dashboards, and reports 1262. In some embodiments, the partner 1214 instantiates an API dataset, view dataset, gauges, dashboards, and reports 1266.

Figure 13:
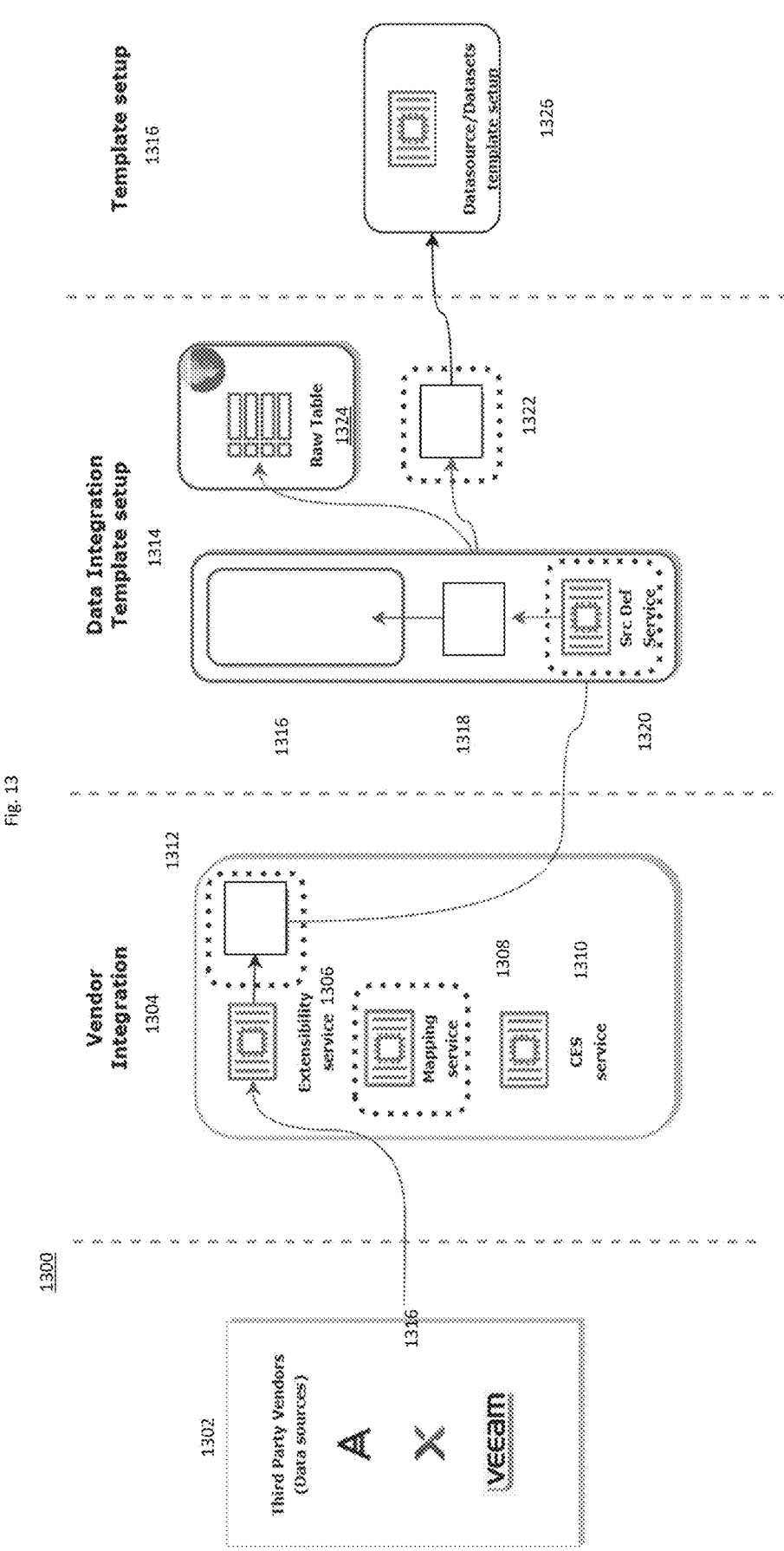
FIG. 13 is a block diagram of vendor integration pipeline according to embodiments of the present disclosure.

FIG. 13 is a block diagram 1300 of vendor integration pipeline according to embodiments of the present disclosure. A configuration file (e.g., a YAML configuration file) of a third party vendor 1302 is provided to a vendor integration stage 1304. An extensibility service 1306 processes the configuration file, and in combination with a mapping service 1308 and customer Engineering Service (CES) service 1308, provides endpoints of the data sources to a data streaming platform/message schema 1312.

The vendor integration stage 1304, via the data streaming platform 1312, outputs information about the data source to a source definition service 1320. The source definition service 1320 provides the initially received data to a data ingestion service 1318. The ingested data is them provided to a data container and/or data integration tool 1316. Together, the data ingestion service 1318 and data container and/or data integration tool 1316 provide a raw table 1324 for data. The also update the data streaming platform/message schema 1322, which is provided to the data source/dataset template setup 1326.

Figure 14A:
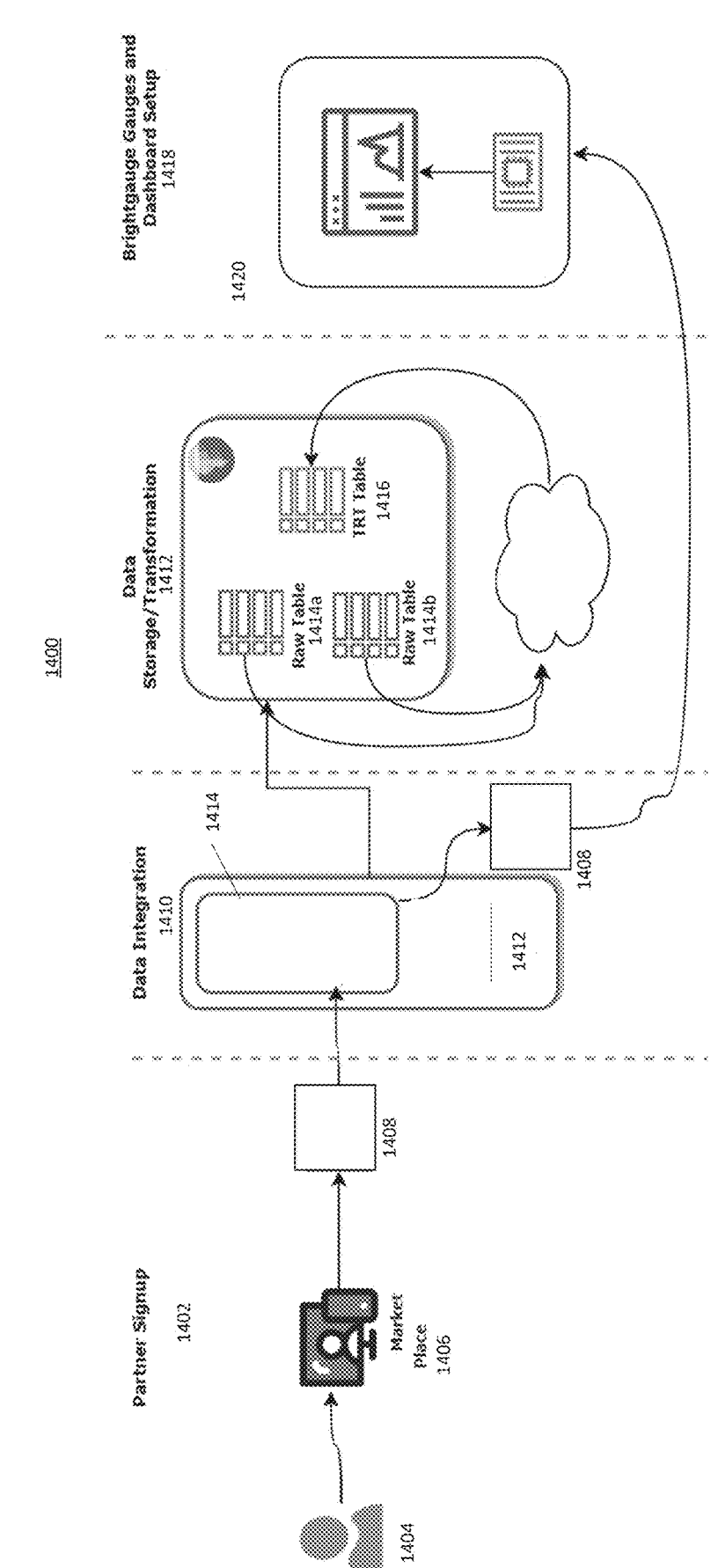
FIGS. 14A-B are block diagrams of a partner signup pipeline (e.g., a configuration-driven data pipeline) according to embodiments of the present disclosure.

FIG. 14A is a block diagram 1400 of a partner signup pipeline (e.g., a configuration-driven data pipeline) according to embodiments of the present disclosure. In a partner signup 1402, a user 1404 interacts with a user interface on a marketplace 1406. The user provides a data schema 1408 to the marketplace 1406. In some embodiments, the data schema 1408 can be employes a YAML configuration file detailing data sources, transformations, and the target data store. The YAML file can be modified to alter the data pipeline (e.g., by adjusting the integration template and integration). As a result, non-technical business users or operational teams can adapt the pipeline without developer intervention.

In some embodiments, architectures frames data into different stages. One naming convention for the data pipeline stages are Bronze, Silver, and Gold, but a person of ordinary skill in the art can recognize that these stages can have other names, such as raw, trusted, and serving. FIG. 14A illustrates the stages as data integration 1410, data storage/transformation 1412 and gauges and dashboard setup 1418.

In some embodiments, the data integration stage 1410 provides for ingesting data from external systems (e.g., the data sources of FIG. 13) and outputting it as raw tables 1414a-b. The data structure mirrors the source system's table structures, complemented by additional metadata like load date/time and process ID. A person of ordinary skill in the art can recognize that any number of raw tables 1414a-b can be provided, and the number of tables is not limited to two. The data integration stage 1410 creates the data by running containerized application(s) 1412 and employing data container and/or data integration tools 1414. The data integration layer 1410 can further update the data schema 1408.

In some embodiments, the data storage/transformation stage 1412 can be used to clean and transform the raw tables 1414a-b from the bronze stage. The cleaned data is then stored in a table 1416 having standardized format, offering enriched datasets for advanced business analysis. In some embodiments, the silver/trusted stage can employs versioning for master data using the Slowly Changing Dimension (SCD) pattern, while transaction data is deduplicated and contextualized with master data.

In some embodiments, the Dashboard and Gauges setup stage 1418 aggregates data from the data storage/transformation stage 1412 and organizes it into a format ready for consumption and analysis. The workspace 1420 displays the data using one or more gauges.

In some embodiments, embodiments of the system and method of the present disclosure expedite data pipeline implementation and swiftly adapt to evolving business requirements. This approach shifts the ownership of data applications from data engineers to business teams. Consequently, data engineers can concentrate on developing infrastructure and frameworks that more effectively support business logic.

Figure 14B:
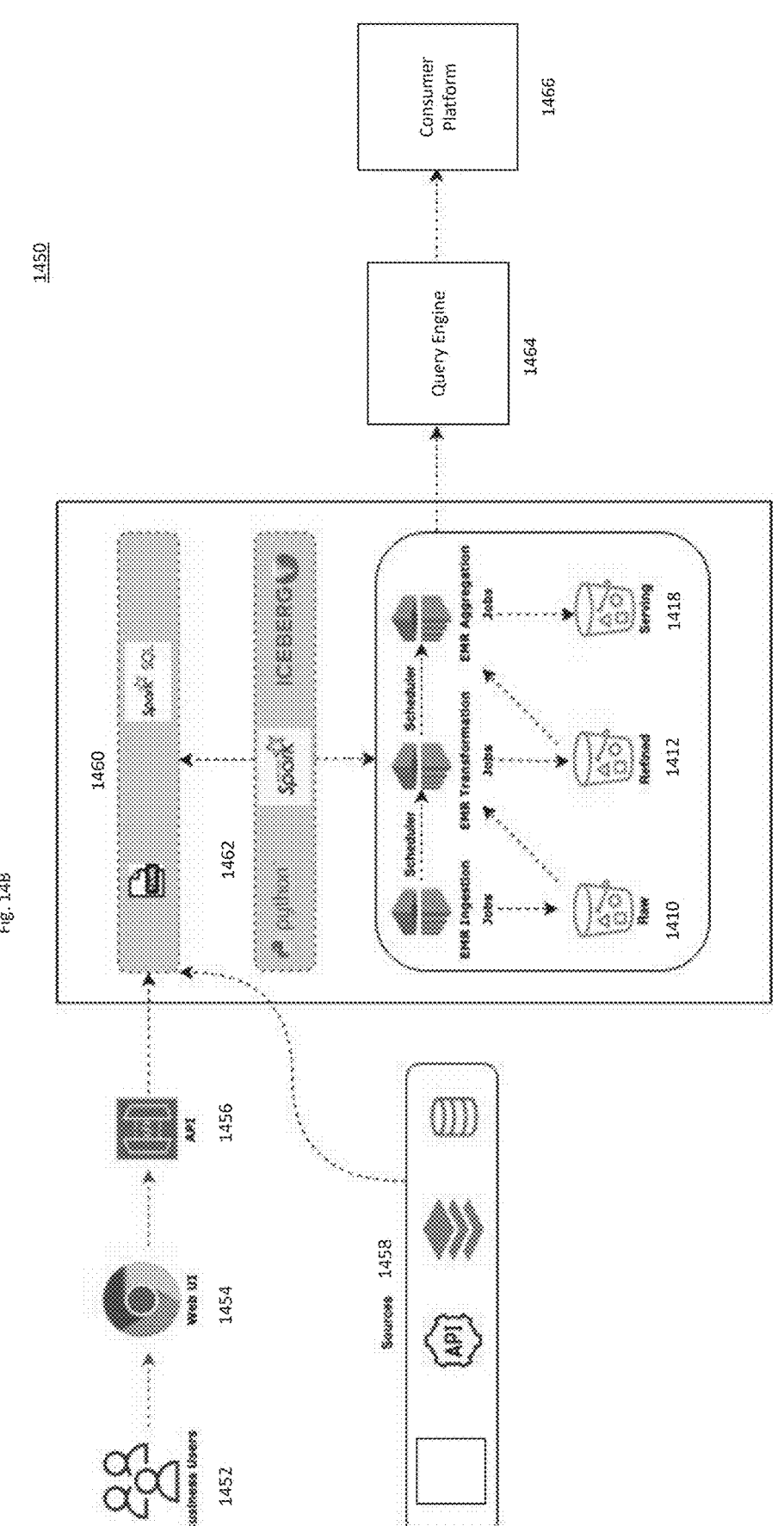

FIG. 14B is a block diagram of the stages as data integration (raw) 1410, data storage/transformation (e.g., refined) 1412 and gauges and dashboard setup (e.g., serving) 1418 according to embodiments of the present disclosure. Business users 1452 access a web user interface 1454 to generate a custom API to access data sources 1456 using configuration files 1460 of a data schema of the data source 1458. In some embodiments, the configurable data pipeline comprises a framework and a configuration. The framework can load configuration files that access server data, and translates that server data into jobs based on the configuration files. The framework can simplify interaction with the infrastructure and allow users to focus on business logic rather than technical details. The framework, grounded in data streaming, is maintained by developers. It presents a streamlined interface for users, effectively bridging the gap between technical complexity and business functionality.

Using database intermediary layers 1462, a data processing layer receives raw data 1410 received from Elastic MapReduce (EMR) ingestion jobs. EMR transformation jobs provide refined data 1412. EMR aggregation jobs then provide serving data 1418. The serving data 1418 can be provided to the query engine 1464. A consumer platform 1466 can then access the stored data and provide it in a workplace with gauges to the user.

In some embodiments, the configuration servers as the pipeline's metadata. The configuration delineates the stages of the pipeline, data source details, and the logic for transformation and aggregation. The pipeline configuration is accessible through a set of APIs, enabling technical operation teams to manage it via a Web User Interface that interfaces with these APIs. This layer of abstraction allows for flexible and user-friendly management of the pipeline's configuration, aligning with dynamic business needs.

Figure 15:
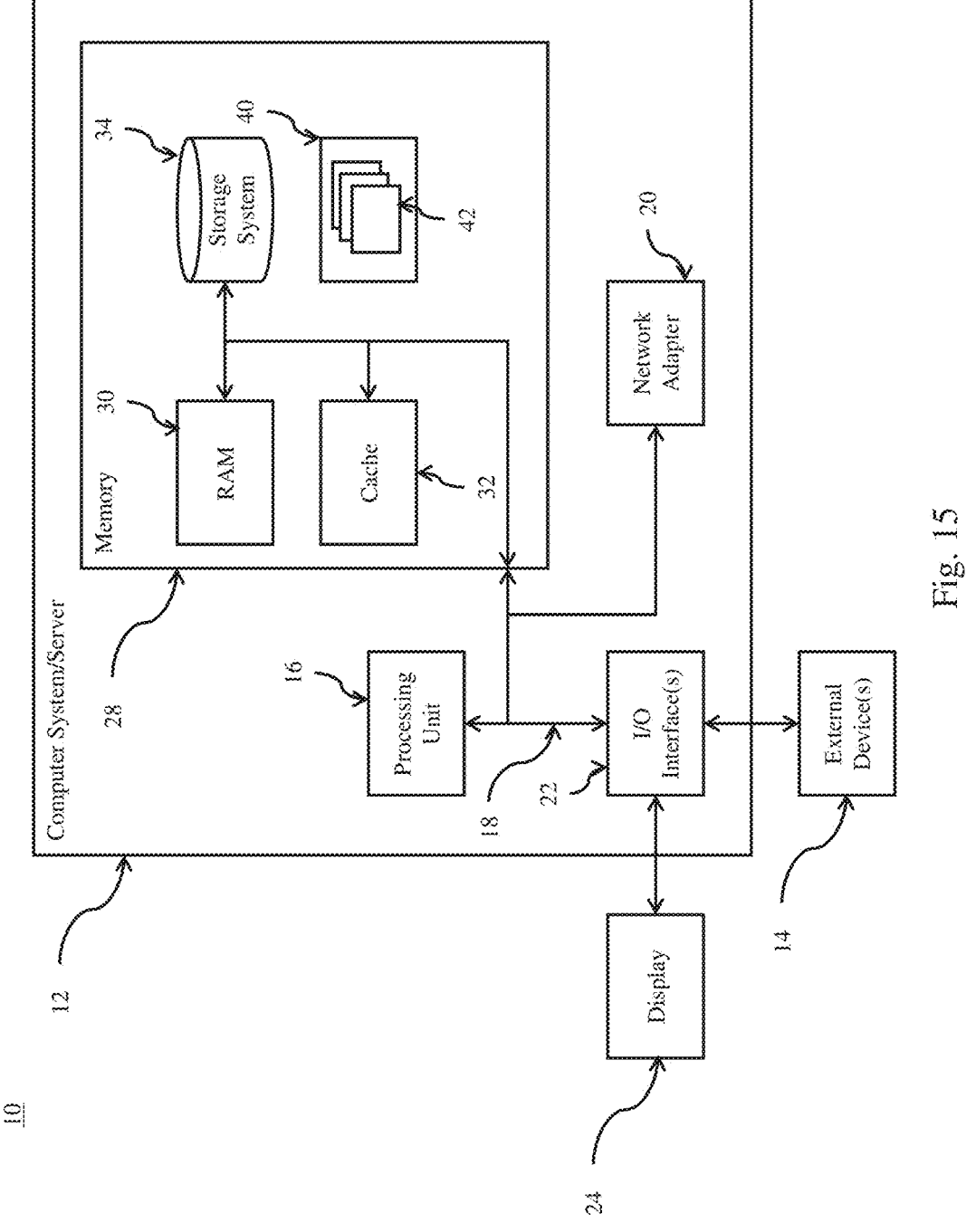
FIG. 15 is a schematic of a computing node according to embodiments of the present disclosure.

FIG. 15 is a schematic of a computing node 10 according to embodiments of the present disclosure. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
   receiving a network address of a configuration file that includes parameters to interface with a server over a network;
   extracting, from the configuration file, a plurality of endpoints and a plurality of operations available to send to the server to manipulate each endpoint;
   displaying, in a web interface, a first table having a plurality of rows, each row displaying (a) an endpoint of the plurality of endpoints and (b) a menu for selecting a one of the operations of the plurality of operations available to send to the server to manipulate the endpoint;
   upon selection of a given row of the plurality of rows of the first table, displaying, in the web interface, an input field, the input field, for the one of the operations to send to the server to manipulate the endpoint, accepting one or more of a parameter, authorization, header, body, and response data;
   gathering, from the server, a plurality of data fields available at the endpoint; and
   displaying, in the web interface, a second table having a plurality of rows, each row having one of the plurality of data fields, and inputs for one or more of a data type, a column type, a display name, unit, description, primary key, secondary key, and an indexing toggle;
   displaying, in the web interface, a third table having a plurality of rows, each row having one of the plurality of data fields and a toggle for including the data field in a workspace dashboard;

displaying, in the web interface, data operation inputs including at least one of a table joining input, a data formula input, and a data filter input, sending a submission of the workspace dashboard to be published, the workspace dashboard defined by:

(a) the one of the operations to send to the server to manipulate the endpoint, and the one or more of a parameter, authorization, header, body, and response data, (b) the plurality of data fields selected by the third table, and one or more of a data type, column type, a display name, unit, description, primary key, secondary key, and an indexing toggle, and (c) the data operation inputs.

2. The computer-implemented method of claim 1, further comprising:

displaying, in the web interface, the workspace dashboard including a real-time representation of values of results of the data operation inputs on the plurality of data fields, the real-time representation being streamed to the web interface as the one of the operations are sent to the server.

3. The computer-implemented method of claim 1, further comprising:

sending the workplace dashboard to a second server for verification;

upon verification at the second server, publishing the workplace dashboard in a public or semi-public directory.

4. The computer-implemented method of claim 1, wherein the interface with the server over the network is one or more of REST API, GraphQL, Kafka, OData, Websocket, OpenAPI, and FileSystem.

5. The computer-implemented method of claim 1, wherein each row of the first table further includes inputs for one or more of refresh rate, and timeout length.

6. The computer-implemented method of claim 1, wherein the configuration file is formatted as one or more of a YAML file and a Swagger file.

7. The computer-implemented method of claim 1, further comprising:

extracting, from the configuration file, server information, the server information being one or more of a product logo file, product type, product name, and a connector type;

displaying the server information in the web interface in a same screen as the first table.

8. A system comprising:

a computing node comprising a computer readable storage medium having program instructions embodied therewith, the program instructions executable by a processor of the computing node to cause the processor to perform a method comprising:

receiving a network address of a configuration file that includes parameters to interface with a server over a network;

extracting, from the configuration file, a plurality of endpoints and a plurality of operations available to send to the server to manipulate each endpoint;

displaying, in a web interface, a first table having a plurality of rows, each row displaying (a) an endpoint of the plurality of endpoints and (b) a menu for selecting one of the operations available of the plurality of operations available to send to the server to manipulate the endpoint;

upon selection of a given row of the plurality of rows of the first table, displaying, in the web interface, an input field, the input fields, for the one of the operations available to send to the server to manipulate the endpoint, accepting one or more of parameter, authorization, header, body, and response data;

gathering, from the server, a plurality of data fields available at the endpoint; and displaying, in the web interface, a second table having a plurality of rows, each row having one of the plurality of data fields, and inputs for one or more of data type, column type, a display name, unit, description, primary key, secondary key, and an indexing toggle;

displaying, in the web interface, a third table having a plurality of rows, each row having one of the plurality of data fields and a toggle for including the data field in a workspace dashboard;

displaying, in the web interface, data operation inputs including at least one of a table joining input, a data formula input, and a data filter input, sending a submission of the workspace dashboard to be published, the workspace dashboard defined by:

(a) the one of the operations available to send to the server to manipulate the endpoint, and the one or more of parameter, authorization, header, body, and response data, (b) the plurality of data fields selected by the third table, and one or more of data type, column type, a display name, unit, description, primary key, secondary key, and an indexing toggle, and (c) the data operation inputs.

9. The system of claim 8, further comprising:

displaying, in the web interface, the workspace dashboard including a real-time representation of values of results of the data operation inputs on the plurality of data fields, the real-time representation being streamed to the web interface as the one of the operations available is sent to the server.

10. The system of claim 8, further comprising:

sending the workplace dashboard to a second server for verification;

upon verification at the second server, publishing the workplace dashboard in a public or semi-public directory.

11. The system of claim 8, wherein the interface with the server over the network is one or more of REST API, GraphQL, Kafka, OData, Websocket, OpenAPI, and FileSystem.

12. The system of claim 8, wherein each row of the first table further includes inputs for one or more of refresh rate, and timeout length.

13. The system of claim 8, wherein the configuration file is formatted as one or more of a YAML file and a Swagger file.

14. The system of claim 8, further comprising:

extracting, from the configuration file, server information, the server information being one or more of a product logo file, product type, product name, and a connector type;

displaying the server information in the web interface in a same screen as the first table.

15. A computer program product for generating an integration, the computer program product comprising a computer readable storage medium having program instructions embodied therewith, the program instructions executable by a computer to cause the computer to perform a method comprising:

receiving a network address of a configuration file that includes parameters to interface with a server over a network;

extracting, from the configuration file, a plurality of endpoints and a plurality of operation available to send to the server to manipulate each endpoint;

displaying, in a web interface, a first table having a plurality of rows, each row displaying (a) an endpoint of the plurality of endpoints and (b) a menu for selecting one of the plurality of operations available to send to the server to manipulate the endpoint;

upon selection of a given row of the plurality of rows of the first table, displaying, in the web interface, one or more input fields, the input fields, for the one of the operations available to send to the server to manipulate the endpoint, accepting one or more of parameter, authorization, header, body, and response data;

gathering, from the server, a plurality of data fields available at the endpoint; and displaying, in the web interface, a second table having a plurality of rows, each row having one of the plurality of data fields, and inputs for one or more of data type, column type, a display name, unit, description, primary key, secondary key, and an indexing toggle;

displaying, in the web interface, a third table having a plurality of rows, each row having one of the plurality of data fields and a toggle for including the data field in a workspace dashboard;

displaying, in the web interface, data operation inputs including at least one of a table joining input, a data formula input, and a data filter input, sending a submission of the workspace dashboard to be published, the workspace dashboard defined by:

(a) the one of the operations available to send to the server to manipulate the endpoint, and the one or more of parameter, authorization, header, body, and response data, (b) the plurality of data fields selected by the third table, and one or more of data type, column type, a display name, unit, description, primary key, secondary key, and an indexing toggle, and (c) the data operation inputs.

16. The computer program product of claim 15, further comprising:

displaying, in the web interface, the workspace dashboard including a real-time representation of values of results of the data operation inputs on the plurality of data fields, the real-time representation being streamed to the web interface as the one of the operations available is sent to the server.

17. The computer program product of claim 15, further comprising:

sending the workplace dashboard to a second server for verification;

upon verification at the second server, publishing the workplace dashboard in a public or semi-public directory.

18. The computer program product of claim 15, wherein the interface with the server over the network is one or more of REST API, GraphQL, Kafka, OData, Websocket, OpenAPI, and FileSystem.

19. The computer program product of claim 15, wherein each row of the first table further includes inputs for one or more of refresh rate, and timeout length.

20. The computer program product of claim 15, wherein the configuration file is formatted as one or more of a YAML file and a Swagger file.

21. The computer program product of claim 15, further comprising:

extracting, from the configuration file, server information, the server information being one or more of a product logo file, product type, product name, and a connector type;

displaying the server information in the web interface in a same screen as the first table.

* * * * *